(12) United States Patent
Meng et al.

(10) Patent No.: US 11,374,778 B2
(45) Date of Patent: Jun. 28, 2022

(54) METHOD AND APPARATUS FOR MULTICAST SERVICE AVAILABILITY

(71) Applicant: Huawei Technologies Co., Ltd., Shenzhen (CN)

(72) Inventors: Rui Meng, Beijing (CN); Chuang Wang, Beijing (CN); Zhe Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 16/862,055

(22) Filed: Apr. 29, 2020

(65) Prior Publication Data

US 2020/0259672 A1      Aug. 13, 2020

Related U.S. Application Data

(63) Continuation of application No. PCT/CN2018/111921, filed on Oct. 25, 2018.

(30) Foreign Application Priority Data

Oct. 31, 2017   (CN) .......................... 201711046331.9

(51) Int. Cl.
  *H04L 12/18*      (2006.01)
  *H04L 12/46*      (2006.01)
  *H04L 45/16*      (2022.01)

(52) U.S. Cl.
  CPC .......... *H04L 12/185* (2013.01); *H04L 12/189* (2013.01); *H04L 12/1886* (2013.01); *H04L 12/46* (2013.01); *H04L 45/16* (2013.01)

(58) Field of Classification Search
  CPC . H04L 12/185; H04L 12/1886; H04L 12/189; H04L 12/46; H04L 45/16
  See application file for complete search history.

(56) References Cited

U.S. PATENT DOCUMENTS 9,674,075 B1 *   6/2017  Nagarajan .............. H04L 12/185
10,523,456 B2 *  12/2019 Allan ....................... H04L 45/48
(Continued)

FOREIGN PATENT DOCUMENTS

CN    101150423 A    3/2008
CN    102075417 A    5/2011
(Continued)

OTHER PUBLICATIONS

B. Fenner et al., "Protocol Independent Multicast—Sparse Mode (PIM-SM): Protocol Specification (Revised)," Request for Comments: 7761, pp. 1-137 (Mar. 2016).

(Continued)

*Primary Examiner* — Mohamed A. Wasel
(74) *Attorney, Agent, or Firm* — Leydig, Voit & Mayer, Ltd.

(57) ABSTRACT

This application provides a multicast service implementation method and apparatus. The method includes: receiving, by a first network device, a first unicast join message sent by a second network device, where the first unicast join message is used to request to join a multicast group, a source address of the first unicast join message is an address of the second network device, and a destination address of the first unicast join message is a multicast source address or a rendezvous point (RP) address; and establishing, by the first network device, a tunnel from the first network device to the second network device based on the first unicast join message. The multicast service implementation method and apparatus in embodiments of this application help improve availability of a multicast service.

20 Claims, 10 Drawing Sheets

(56) References Cited

U.S. PATENT DOCUMENTS

| | | | | |
|---|---|---|---|---|
| 2008/0101360 | A1* | 5/2008 | Napierala | H04L 45/50 370/390 |
| 2009/0067426 | A1* | 3/2009 | Ko | H04L 47/10 370/392 |
| 2014/0241357 | A1 | 8/2014 | Liu et al. | |
| 2015/0358226 | A1* | 12/2015 | Liu | H04L 12/18 370/390 |
| 2017/0289217 | A1* | 10/2017 | Kebler | H04L 12/1886 |

FOREIGN PATENT DOCUMENTS

| | | |
|---|---|---|
| CN | 102325266 A | 1/2012 |
| CN | 103401788 A | 11/2013 |
| CN | 103916905 A | 7/2014 |
| CN | 104283796 A | 1/2015 |
| CN | 106817629 A | 6/2017 |
| WO | 02098063 A1 | 12/2002 |
| WO | 2008071111 A1 | 6/2008 |

OTHER PUBLICATIONS

Aggarwal et al., "PIM-SM Extensions for Supporting Remote Neighbors; draft-raggarwa-pim-sm-remote-nbr-01.txt" XP015034188, total 8 pages, IETF (TRUST), Internet Engineering Task Force, Reston, Virginia (Jul. 2004).

* cited by examiner

R8

```
Multicast group address: 224.10.10.10
Multicast source address: 10.10.10.1
Outbound interface list: (tunnel 3)
```

DR 3

```
Multicast group address: 224.10.10.10
Multicast source address: 10.10.10.1
Outbound interface list: (port 1)
```

FIG. 6

METHOD AND APPARATUS FOR MULTICAST SERVICE AVAILABILITY

CROSS-REFERENCE TO RELATED APPLICATIONS

This application is a continuation of International Application No. PCT/CN2018/111921, filed on Oct. 25, 2018, which claims priority to Chinese Patent Application No. 201711046331.9, filed on Oct. 31, 2017. The disclosures of the aforementioned applications are hereby incorporated by reference in their entireties.

TECHNICAL FIELD

Embodiments of this application relate to the communications field, and in particular, to a multicast service implementation method and apparatus in the communications field.

BACKGROUND

Multicast means that a multicast source sends information only once, a multicast router creates a tree route for a multicast data packet by using a multicast routing protocol, and transmitted information starts to be replicated and distributed only at a branch as far as possible from the multicast source. The multicast requires that all routers in a network support a related multicast routing protocol. The Protocol Independent Multicast-Sparse Mode (PIM-SM) is used as an example. The PIM-SM is a multicast routing protocol, and is used to establish a multicast routing entry hop by hop from a receive end to a multicast source direction or a rendezvous point direction, to finally construct a tree-like structure (namely, a multicast tree) that uses a multicast source or a rendezvous point (RP) as a root and the receive end as a leaf. A multicast packet is replicated on each multicast router from a root node towards a leaf direction till the receive end. A multicast tree that uses the RP as a root may be referred to as a rendezvous point tree (RPT), and a multicast tree that uses the source as a root may be referred to as a source-specific shortest-path tree (SPT).

Establishment of the multicast tree requires that all the routers need to support the PIM-SM protocol. A router that supports the PIM-SM protocol may be referred to as a PIM-SM router. In other words, all routers on the multicast tree need to be PIM-SM routers. In a joining process, in a process in which a multicast router constructs a multicast join message, if a next-hop router of the multicast router does not support the PIM-SM protocol, the router cannot join the multicast tree, and a terminal device of the multicast router cannot receive a multicast packet. Therefore, availability of a multicast service is relatively poor.

SUMMARY

This application provides a multicast service implementation method and apparatus, to help improve availability of a multicast service.

According to a first aspect, a multicast service implementation method is provided, including: receiving, by a first network device, a first unicast join message sent by a second network device, where the first unicast join message is used to request to join a multicast group, a source address of the first unicast join message is an address of the second network device, and a destination address of the first unicast join message is a multicast source address or a rendezvous point RP address; and establishing, by the first network device, a tunnel from the first network device to the second network device based on the first unicast join message.

Specifically, a terminal device may send a join request message to the second network device, to request to join the multicast group. Based on the join request message, the second network device constructs and sends the first unicast join message. The destination address of the first unicast join message is the multicast source address or the RP address. A first device that can identify the first unicast join message in a network, namely, the first network device, may capture the first unicast join message. The first network device may establish the tunnel from the first network device to the second network device based on the first unicast access message, so that the first network device can subsequently forward a multicast packet to the second network device, and then the second network device forwards the multicast packet to the terminal device.

According to the multicast service implementation method in this embodiment of this application, the unicast join message is introduced, and a multicast router that intercepts the unicast join message can automatically establish a tunnel to connect to a local router, to automatically traverse a unicast network. In this way, a multicast router whose next-hop router does not support a multicast routing protocol can join the multicast group, thereby helping improve availability of a multicast service.

With reference to the first aspect, in some implementations of the first aspect, before the establishing, by the first network device, a tunnel from the first network device to the second network device based on the first unicast join message, the method further includes: determining, by the first network device based on a first field carried in the first unicast join message, whether the second network device is a neighboring node of the first network device, where each time the first unicast join message is forwarded by one network device, a value of the first field is subtracted by 1; and the establishing, by the first network device, a tunnel from the first network device to the second network device based on the first unicast join message includes: if the second network device is not the neighboring node of the first network device, establishing, by the first network device, the tunnel from the first network device to the second network device.

It should be understood that the first field is a field in the first unicast join message, and each time the first unicast join message is forwarded by one network device, the value of the first field is subtracted by 1. Therefore, the first network device may determine, based on the value of the first field, a quantity of times the first unicast join message is forwarded, to be specific, determine whether a sender of the first unicast join message is a neighbor of the first network device. In a specific implementation, the first field may be a time to live (TTL) field in the Internet Protocol version 4 (IPv4), or may be a hop limit field in the Internet Protocol version 6 (IPv6). This is not limited in this embodiment of this application.

With reference to the first aspect, in some implementations of the first aspect, the method further includes: if the first field is equal to an initial value, determining, by the first network device, that the second network device is the neighboring node of the first network device; or if the first field is less than the initial value, determining, by the first network device, that the second network device is not the neighboring node of the first network device.

With reference to the first aspect, in some implementations of the first aspect, when the destination address of the first unicast join message is the multicast source address, an address of the first network device is different from the multicast source address; or when the destination address of the first unicast join message is the RP address, an address of the first network device is different from the RP address.

Specifically, if the terminal device requests to join a multicast tree SPT that uses a multicast source as a root, the destination address of the first unicast join message is the multicast source address, and the address of the first network device is different from the multicast source address. To be specific, the first network device may be an intermediate node, for example, a multicast router. If the terminal device requests to join a multicast tree RPT that uses an RP as a root, the destination address of the first unicast join message is the RP address, and the address of the first network device is different from the RP address. To be specific, the first network device may be an intermediate node, for example, a multicast router.

With reference to the first aspect, in some implementations of the first aspect, the method further includes: establishing, by the first network device, a correspondence between the multicast group and the tunnel from the first network device to the second network device.

Specifically, the first network device establishes the tunnel from the first network device to the second network device, and further needs to establish the correspondence between the multicast group and the tunnel. In a specific implementation, the first network device may add, to an outbound interface list of a multicast forwarding entry, the tunnel from the first network device to the second network device.

With reference to the first aspect, in some implementations of the first aspect, after the establishing, by the first network device, a tunnel from the first network device to the second network device based on the first unicast join message, the method further includes: sending, by the first network device, a first multicast join message, where the first multicast join message is used to request to join the multicast group, a source address of the first multicast join message is the address of the first network device, and a destination address of the first multicast join message is a multicast address of a multicast router.

Specifically, after the first network device establishes the tunnel from the first network device to the second network device, the first network device may further send the first multicast join message upward. The destination address of the first multicast join message is the multicast address of the multicast router. It should be understood that, in specific implementation, the first network device continues to send the first multicast join message upward on the premise that the multicast forwarding entry of the first network device is newly created after the first unicast join message is received, and an upstream neighbor of the first network device is a PIM-SM neighbor of the first network device. However, this is not limited in this embodiment of this application. In a specific implementation, all multicast routers in this network system support the PIM-SM protocol, and the destination address of the first multicast join message is 224.0.0.13.

With reference to the first aspect, in some implementations of the first aspect, after the establishing, by the first network device, a tunnel from the first network device to the second network device based on the first unicast join message, the method further includes: sending, by the first network device, a second unicast join message, where the second unicast join message is used to request to join the multicast group, a source address of the second unicast join message is the address of the first network device, and a destination address of the second unicast join message is the multicast source address or the RP address.

Specifically, after the first network device establishes the tunnel from the first network device to the second network device, the first network device may further send the second unicast join message upward. The destination address of the second unicast join message is the multicast source address or the RP address. It should be understood that, in specific implementation, if the multicast forwarding entry of the first network device is newly created after the first unicast join message is received, the first network device needs to continue to send the second unicast join message upward.

With reference to the first aspect, in some implementations of the first aspect, the first network device supports the Protocol Independent Multicast-Sparse Mode (PIM-SM) protocol, and before the sending, by the first network device, a second unicast join message, the method further includes: looking up, by the first network device, a table based on the multicast source address or the RP address, to obtain an address of an upstream neighbor of the first network device; and determining, by the first network device based on the address of the upstream neighbor, whether the upstream neighbor supports the PIM-SM protocol; and the sending, by the first network device, a second unicast join message includes: if the upstream neighbor does not support the PIM-SM protocol, sending, by the first network device, the second unicast join message.

Specifically, before sending the second unicast join message, the first network device may also determine whether the upstream neighbor of the first network device supports the PIM-SM protocol, to be specific, determine whether the upstream neighbor of the first network device is a PIM-SM neighbor of the first network device. If the upstream neighbor supports the PIM-SM protocol, the first network device may send the first multicast join message to the upstream neighbor; or if the upstream neighbor does not support the PIM-SM protocol, the second network device may send the second unicast join message.

With reference to the first aspect, in some implementations of the first aspect, the method further includes: receiving, by the first network device, a first unicast prune message sent by a third network device, where the first unicast prune message is used to request to leave the multicast group, a source address of the first unicast prune message is an address of the third network device, and a destination address of the first unicast prune message is the multicast source address or the RP address; determining, by the first network device based on the first unicast prune message, whether there is a first multicast forwarding entry corresponding to information carried in the first unicast prune message; if there is no first multicast forwarding entry, determining, by the first network device, whether the address of the first network device is the same as the destination address of the first unicast prune message; and if the address of the first network device is the same as the destination address of the first unicast prune message, ignoring, by the first network device, the first unicast prune message; or if the address of the first network device is different from the destination address of the first unicast prune message, continuing, by the first network device, to forward the first unicast prune message based on the destination address of the first unicast prune message.

Specifically, the first network device may receive the first unicast prune message sent by the third network device, and determine, based on the first unicast prune message, whether there is the first multicast forwarding entry. The first multicast forwarding entry corresponds to the information carried in the first unicast prune message. For example, if the first unicast prune message carries a multicast group address the first multicast forwarding entry may be (*, G); or if the first unicast prune message carries a multicast group address G and a multicast source address S, the first multicast forwarding entry may be (S, G).

If there is no first multicast forwarding entry, the first network device determines whether the address of the first network device is the same as the destination address of the first unicast prune message. When the address of the first network device is different from the destination address of the first unicast prune message, the first network device continues to forward the first unicast prune message. It should be understood that, when the address of the first network device is the same as the destination address of the first unicast prune message, because there is no first multicast forwarding entry, it indicates that there is no corresponding branch, the first unicast prune message is sent incorrectly, and the first network device may ignore the first unicast prune message.

With reference to the first aspect, in some implementations of the first aspect, the method further includes: if there is the first multicast forwarding entry, determining, by the first network device, whether there is a tunnel from the first network device to the third network device; and if there is no tunnel from the first network device to the third network device, deleting, by the first network device from an outbound interface list of the first multicast forwarding entry, a physical interface used for receiving the first unicast prune message; or if there is the tunnel from the first network device to the third network device, tearing down, by the first network device, the tunnel from the first network device to the third network device, and deleting, from an outbound interface list of the first multicast forwarding entry, the tunnel from the first network device to the third network device.

Specifically, when there is the first multicast forwarding entry corresponding to the information carried in the first unicast prune message, the first network device may determine whether there is the tunnel from the first network device to the third network device. If there is no tunnel, the first network device may directly delete, from the outbound interface list of the first multicast forwarding entry, the physical interface used for receiving the first unicast prune message. If there is the tunnel, the first network device needs to tear down the tunnel, and delete the tunnel from the outbound interface list of the first multicast forwarding entry.

With reference to the first aspect, in some implementations of the first aspect, the method further includes: determining, by the first network device, whether the outbound interface list of the first multicast forwarding entry is empty; and if the outbound interface list of the first multicast forwarding entry is empty, deleting, by the first network device, the first multicast forwarding entry.

Specifically, after processing the first unicast prune message, the first network device may further determine whether the outbound interface list of the first multicast forwarding entry is empty. If the outbound interface list is empty, the first network device may delete the first multicast forwarding entry. It should be understood that if the outbound interface list is not empty, it indicates that there is still another branch of the first network device on a corresponding multicast tree, and the first network device performs no processing.

With reference to the first aspect, in some implementations of the first aspect, the first network device is not a multicast source or a rendezvous point RP, and the method further includes: sending, by the first network device, a second unicast prune message, where the second unicast prune message is used to request to leave the multicast group, a source address of the second unicast prune message is the address of the first network device, and a destination address of the second unicast prune message is the multicast source address or the RP address.

Specifically, if the first network device is not the multicast source or the RP, in other words, the first network device is not a root node, after deleting the first multicast forwarding entry, the first network device needs to continue to send the second unicast prune message upward till the multicast source or the RP.

With reference to the first aspect, in some implementations of the first aspect, the method further includes: when the first network device receives a multicast packet, determining, by the first network device, whether there is a second multicast forwarding entry corresponding to a destination address of the multicast packet; if there is no second multicast forwarding entry, determining, by the first network device, whether the multicast packet has been encapsulated by using a tunnel; and if the multicast packet has not been encapsulated by using the tunnel, sending, by the first network device, a third unicast prune message, where the third unicast prune message is used to request to leave the multicast group, a source address of the third unicast prune message is the address of the first network device, and a destination address of the third unicast prune message is the multicast source address or the RP address; or if the multicast packet has been encapsulated by using the tunnel, sending, by the first network device, a fourth unicast prune message, where the fourth unicast prune message is used to request to leave the multicast group, a source address of the fourth unicast prune message is the address of the first network device, and a destination address of the fourth unicast prune message is a tunnel source address of the tunnel used for encapsulating the multicast packet.

Specifically, after the first network device receives the multicast packet, the first network device may determine, based on the destination address of the multicast packet, whether there is the corresponding second multicast forwarding entry. If there is the corresponding second multicast forwarding entry, the first network device may directly send the multicast packet to a corresponding outbound interface based on an outbound interface list in the second multicast forwarding entry. If there is no corresponding second multicast forwarding entry, the first network device may send a unicast prune message, to request the multicast source to stop sending the multicast packet to the first network device. The first network device may determine whether the multicast packet has been encapsulated by using the tunnel. If the multicast packet has not been encapsulated by using the tunnel, the first network device may send the third unicast prune message whose destination address is the multicast source address or the RP address. If the multicast packet has been encapsulated by using the tunnel, the first network device may send the fourth unicast prune message whose destination address is the tunnel source address of the tunnel used for encapsulating the multicast packet. In this embodiment of this application, sending of the prune message is triggered by using the multicast packet, so that unnecessary multicast packet forwarding can be avoided, thereby reducing overheads.

With reference to the first aspect, in some implementations of the first aspect, the first unicast join message is a periodically sent message, a sending cycle of the first unicast join message is a first time period, and the method further includes: if the first network device does not receive, within the first time period, the first unicast join message sent again by the second network device, tearing down, by the first network device, the tunnel from the first network device to the second network device.

With reference to the first aspect, in some implementations of the first aspect, the first unicast join message is a periodically sent message, a sending cycle of the first unicast join message is a first time period, and the method further includes:

if the first network device does not receive, within the first time period, the first unicast join message sent again by the second network device, deleting, by the first network device from an outbound interface list of a corresponding multicast forwarding entry, a previous physical interface used for receiving the first unicast join message.

In this embodiment of this application, the first unicast join message is a periodically sent message. Each time the first network receives the first unicast join message, the first network device refreshes a timer. Duration of the timer is the first time period. If the first unicast join message has not been received when the timer expires, and if the tunnel is established between the first network device and the second network device, the first network device may tear down the established tunnel from the first network device to the second network device. Further, the first network device may delete the tunnel from the first network device to the second network device from the outbound interface list of the multicast forwarding entry. If there is no tunnel between the first network device and the second network device, the first network device may directly delete, from the outbound interface list of the corresponding multicast forwarding entry, the previously stored physical interface used for receiving the first unicast join message.

According to a second aspect, another multicast service implementation method is provided, including: receiving, by a second network device, a join request message, where the join request message is used to request to join a multicast group, and the join request message carries a multicast group address; and sending, by the second network device, a first unicast join message based on the join request message, where the first unicast join message is used to request to join the multicast group, a source address of the first unicast join message is an address of the second network device, and a destination address of the first unicast join message is a multicast source address or a rendezvous point RP address.

With reference to the second aspect, in some implementations of the second aspect, the second network device supports the Protocol Independent Multicast-Sparse Mode PIM-SM protocol, and before the sending, by the second network device, a first unicast join message based on the join request message, the method further includes: looking up, by the second network device, a table based on the multicast source address or the RP address, to obtain an address of an upstream neighbor of the second network device; and determining, by the second network device based on the address of the upstream neighbor, whether the upstream neighbor supports the PIM-SM protocol; and the sending, by the second network device, a first unicast join message based on the join request message includes: if the upstream neighbor does not support the PIM-SM protocol, sending, by the second network device, the first unicast join message.

With reference to the second aspect, in some implementations of the second aspect, the method further includes: receiving, by the second network device, a leave request message, where the leave request message is used to request to leave the multicast group, and the leave request message carries the multicast group address; deleting, by the second network device based on the leave request message and from an outbound interface list of a multicast forwarding entry corresponding to the multicast group address, a physical interface used for receiving the leave request message, and determining whether the outbound interface list is empty; and if the outbound interface list is empty, sending, by the second network device, a first unicast prune message, where the first unicast prune message is used to request to leave the multicast group, a source address of the first unicast prune message is the address of the second network device, and a destination address of the first unicast prune message is the multicast source address or the RP address.

With reference to the second aspect, in some implementations of the second aspect, before the sending, by the second network device, a first unicast prune message, the method further includes: looking up, by the second network device, a table based on the multicast source address or the RP address, to obtain an address of an upstream neighbor of the second network device; and determining, by the second network device based on the address of the upstream neighbor, whether the upstream neighbor supports the PIM-SM protocol; and the sending, by the second network device, a first unicast prune message includes: if the upstream neighbor does not support the PIM-SM protocol, sending, by the second network device, the first unicast prune message.

According to a third aspect, a multicast service implementation apparatus is provided, to perform the method according to any one of the first aspect or the possible implementations of the first aspect. Specifically, the apparatus includes units configured to perform the method according to any one of the first aspect or the possible implementations of the first aspect.

According to a fourth aspect, a multicast service implementation apparatus is provided, to perform the method according to any one of the second aspect or the possible implementations of the second aspect. Specifically, the apparatus includes units configured to perform the method according to any one of the second aspect or the possible implementations of the second aspect.

According to a fifth aspect, another multicast service implementation apparatus is provided, and the apparatus includes a transceiver, a memory, and a processor. The transceiver, the memory, and the processor communicate with each other by using an internal connection channel. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the first aspect or the possible implementations of the first aspect.

According to a sixth aspect, another multicast service implementation apparatus is provided, and the apparatus includes a transceiver, a memory, and a processor. The transceiver, the memory, and the processor communicate with each other by using an internal connection channel. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the second aspect or the possible implementations of the second aspect.

According to a seventh aspect, a multicast service implementation system is provided, and the system includes the apparatus according to any one of the third aspect or the possible implementations of the third aspect and the apparatus according to any one of the fourth aspect or the possible implementations of the fourth aspect; or the system includes the apparatus according to any one of the fifth aspect or the possible implementations of the fifth aspect and the apparatus according to any one of the sixth aspect or the possible implementations of the sixth aspect.

According to an eighth aspect, a computer program product is provided, and the computer program product includes computer program code. When the computer program code is run by a computer, the computer is enabled to perform the method according to any one of the first aspect or the possible implementations of the first aspect.

According to a ninth aspect, a computer program product is provided, and the computer program product includes computer program code. When the computer program code is run by a computer, the computer is enabled to perform the method according to any one of the second aspect or the possible implementations of the second aspect.

According to a tenth aspect, a computer readable medium is provided, and is configured to store a computer program, and the computer program includes an instruction used to perform the method according to any one of the first aspect or the possible implementations of the first aspect.

According to an eleventh aspect, a computer readable medium is provided, and is configured to store a computer program, and the computer program includes an instruction used to perform the method according to any one of the second aspect or the possible implementations of the second aspect.

BRIEF DESCRIPTION OF DRAWINGS

FIG. 6 is a schematic diagram of another multicast tree branch according to an embodiment of this application;

DESCRIPTION OF EMBODIMENTS

Figure 1:
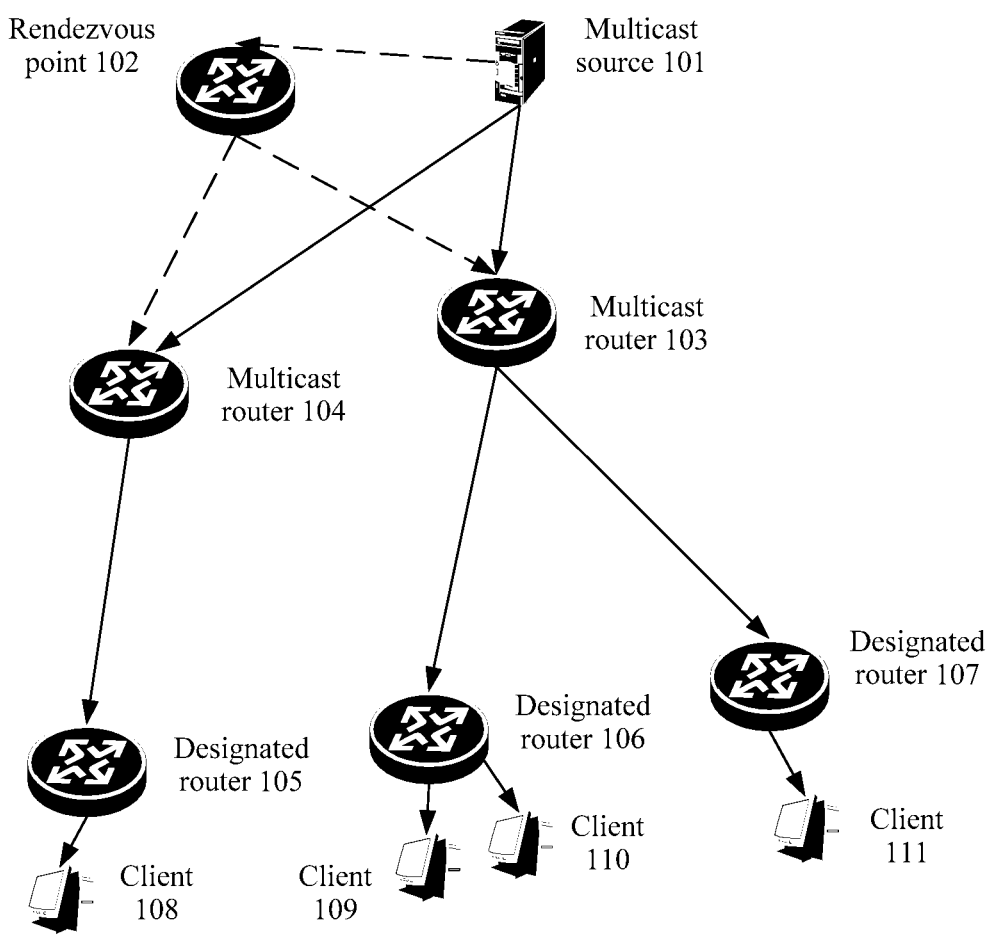
FIG. 1 is a schematic diagram of a network system according to an embodiment of this application.

The following describes technical solutions of this application with reference to the accompanying drawings.

For ease of understanding, terms related to the embodiments of this application are explained below.

Multicast means that a multicast source sends information only once, a multicast router creates a tree route for a multicast data packet by using a multicast routing protocol, and transmitted information starts to be replicated and distributed only at a branch as far as possible from the multicast source.

The Protocol Independent Multicast-Sparse Mode (PIM-SM) is a multicast routing protocol, and is used to establish a multicast routing entry hop by hop from a receive end to a multicast source direction or a rendezvous point RP direction, to finally construct a tree-like structure (namely, a multicast tree) that uses a multicast source or a rendezvous point (RP) as a root and the receive end as a leaf.

A multicast source is usually a server, and may be used to construct a multicast tree SPT that uses the multicast source as a root, so that a multicast packet is replicated and forwarded by the multicast source by using the SPT; or may choose to use a proxy service provided by a rendezvous point RP, to send a multicast packet to the RP first, so that the RP replicates and forwards the multicast packet.

A rendezvous point (RP) is a special router that inherits from a standard PIM-SM protocol and can provide a proxy service for a multicast source. To be specific, the multicast source sends a multicast packet to the RP through a unicast tunnel, and the RP replicates and forwards the multicast packet by using an RPT.

A multicast router is a router that supports distribution of a multicast packet, and establishes a multicast routing table by using a multicast routing protocol. The multicast routing protocol may be PIM-SM, or may be another multicast routing protocol. This is not limited in the embodiments of this application. In this specification, the multicast router is also represented by R.

A designated router (DR) means that a shared medium local area network (such as the Ethernet) may be connected to a plurality of multicast routers, one router may be selected from these multicast routers to provide a multicast routing protocol service for a host in this local area network, and the selected multicast router is a designated router DR, and is also referred to as a gateway.

A client is a host that supports the Internet Group Management Protocol (IGMP), such as a computer or a mobile phone. This is not limited in the embodiments of this application. In this specification, the client is also referred to as a terminal device.

A multicast forwarding entry is saved to a network device that has joined a multicast group (or a multicast group of a designated multicast source), is used to represent an address (or a multicast group address and a multicast source address) of the multicast group that the network device joins, and may be specifically represented as an MFIB entry, or may be represented as (*, G) and (S, G), where*is a wildcard character and indicates that no multicast source is designated, G is a multicast group address, and S is a multicast source address.

An upstream neighbor is a next-hop node when a multicast router sends a message, and the message may be a join message or a prune message.

A PIM-SM neighbor is a neighboring router that supports the PIM-SM protocol.

FIG. 1 is a schematic diagram of a network system according to an embodiment of this application. As shown in FIG. 1, the network system 100 includes a multicast source 101, a multicast router 103, a multicast router 104, a designated router 105, a designated router 106, a designated router 107, a client 108, a client 109, a client 110, and a client 111. Optionally, the network system 100 may further include a rendezvous point 102.

As shown in FIG. 1, when implementing a multicast service, the client may establish a multicast routing entry hop by hop towards a multicast source direction, to finally construct a tree structure (a multicast tree) that uses a multicast source or a rendezvous point as a root and the client as a leaf After the multicast tree is established, the multicast source may forward a multicast packet on each multicast router from a root node towards a leaf direction till the client. It should be understood that the multicast tree structure shown in FIG. 1 can be constructed only when the multicast source, the multicast router, and the designated router in the network system 100 all support the PIM-SM protocol.

FIG. 1 is only an example of a simplified schematic diagram for ease of understanding. The network may further include another quantity of multicast routers, designated routers, clients, and the like, which are not shown in FIG. 1. However, this is not limited in this embodiment of this application. The multicast tree in FIG. 1 has four layers. In actual application, a quantity of layers of the multicast tree may alternatively be another quantity. This is not limited in this embodiment of this application.

Figure 2:
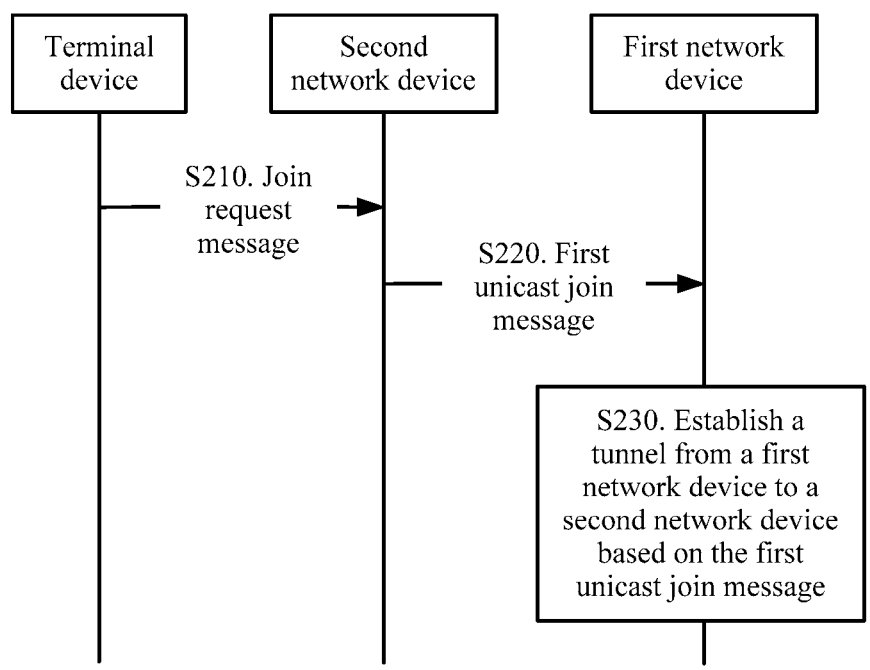
FIG. 2 is a schematic flowchart of a multicast service implementation method according to an embodiment of this application.

FIG. 2 is a schematic flowchart 200 of a multicast service implementation method according to an embodiment of this application. The method 200 may be applied to the network system 100 shown in FIG. 1. However, this is not limited in this embodiment of this application.

S210. A terminal device sends a join request message to a second network device, where the join request message is used to request to join a multicast group, and the join request message carries a multicast group address.

In a possible implementation, the join request message may report an Internet Group Management Protocol membership report IGMP membership report message.

S220. The second network device receives the join request message, and sends a first unicast join message based on the join request message, where the first unicast join message is used to request to join the multicast group, a source address of the first unicast join message is an address of the second network device, and a destination address of the first unicast join message is a multicast source address or a rendezvous point RP address.

S230. A first network device receives the first unicast join message sent by the second network device, and establishes a tunnel from the first network device to the second network device based on the first unicast join message.

Specifically, the terminal device may send the join request message to the second network device, to request to join the multicast group. Based on the join request message, the second network device constructs and sends the first unicast join message. The destination address of the first unicast join message is the multicast source address or the RP address. A first device that can identify the first unicast join message in a network, namely, the first network device, may capture the first unicast join message. The first network device may establish the tunnel from the first network device to the second network device based on the first unicast join message, so that the first network device can subsequently forward a multicast packet to the second network device, and then the second network device forwards the multicast packet to the terminal device.

In specific implementation of capturing the first unicast join message by the first network device, the first multicast router may use a preconfigured access control list to match some feature fields of the first unicast join message, such as a protocol number, a message type, and a destination address type, to intercept a first unicast join message whose destination address is not an address of a multicast router of the first unicast join message. It should be understood that, in the multicast service implementation method in this embodiment of this application, a unicast join message, such as the first unicast join message may be alternatively captured in another manner. This is not limited in this embodiment of this application.

The terminal device may be the client in the network system 100, the second network device may be the designated router DR in the network system 100, and the first network device may be the multicast router in the network system 100, may be the multicast source in the network system 100, or may be the rendezvous point RP in the network system 100. This is not limited in this embodiment of this application.

It should be understood that the join request message and the first unicast join message may carry only the multicast group address, or may carry the multicast group address and the multicast source address. This is not limited in this embodiment of this application. Because one multicast group may include a plurality of multicast sources, the terminal device may choose to join only a multicast group, or may choose to join a multicast group and a specific multicast source in the multicast group. In this specification, a manner in which the terminal device chooses to join a multicast group and a specific multicast source in the multicast group is referred to as a "source-specific manner".

It should be further understood that the join request message may be sent by the terminal device to the second network device, or may be sent by another network device to the second network device. This is not limited in this embodiment of this application.

Generally, in a process of establishing a multicast tree, a router that supports a multicast routing protocol may send a multicast join message hop by hop to a multicast source direction or a rendezvous point RP direction. This requires that all routers support the corresponding multicast routing protocol. In a joining process, in a process in which a multicast router constructs a multicast join message, if a next-hop router of the multicast router does not support the multicast routing protocol, the router cannot join the multicast tree, and a terminal device of the multicast router cannot receive a multicast packet.

According to the multicast service implementation method in this embodiment of this application, the unicast join message is introduced, and a multicast router that intercepts the unicast join message can automatically establish a tunnel to connect to a local router, to automatically traverse a unicast network. In this way, a multicast router whose next-hop router does not support the multicast routing protocol can join the multicast group, thereby helping improve availability of a multicast service.

In an optional embodiment, before the first network device establishes the tunnel from the first network device to the second network device based on the first unicast join message, the method further includes:

determining, by the first network device based on a first field carried in the first unicast join message, whether the second network device is a neighboring node of the first network device, where each time the first unicast join message is forwarded by one network device, a value of the first field is subtracted by 1.

The establishing, by the first network device, a tunnel from the first network device to the second network device based on the first unicast join message includes:

if the second network device is not the neighboring node of the first network device, establishing, by the first network device, the tunnel from the first network device to the second network device.

Specifically, after the first network device receives the first unicast join message, the first network device may first determine, based on the first unicast join message, whether a tunnel needs to be established. The first network device may determine, based on the first field carried in the first unicast join message, whether a sender (namely, the second network device) of the first unicast join message is the neighboring node of the first network device. If the second network device is the neighboring node of the first network device, the first network device may directly add the multicast group address carried in the first unicast join message to a multicast forwarding entry, and add an interface on which the first unicast join message is received to an outbound interface list of the multicast forwarding entry. If the second network device is not the neighboring node of the first network device, the first network device may establish the tunnel from the first network device to the second network device, to subsequently forward a multicast packet.

It should be understood that the first field is a field in the first unicast join message, and each time the first unicast join message is forwarded by one network device, the value of the first field is subtracted by 1. Therefore, the first network device may determine, based on the value of the first field, a quantity of times the first unicast join message is forwarded, to be specific, determine whether the sender of the first unicast join message is a neighbor of the first network device. In a specific implementation, the first field may be a time to live (TTL) field in the Internet Protocol version 4 (IPv4), or may be a hop limit field in the Internet Protocol version 6 (IPv6). This is not limited in this embodiment of this application.

It should be further understood that if the first field is equal to an initial value, the first network device may determine that the second network device is the neighboring node of the first network device; or if the first field is less than the initial value, the first network device may determine that the second network device is not the neighboring node of the first network device.

In an optional embodiment, when the destination address of the first unicast join message is the multicast source address, an address of the first network device is different from the multicast source address.

When the destination address of the first unicast join message is the RP address, an address of the first network device is different from the RP address.

Specifically, if the terminal device requests to join a multicast tree SPT that uses a multicast source as a root, the destination address of the first unicast join message is the multicast source address, and the address of the first network device is different from the multicast source address. To be specific, the first network device may be an intermediate node, for example, a multicast router. If the terminal device requests to join a multicast tree RPT that uses an RP as a root, the destination address of the first unicast join message is the RP address, and the address of the first network device is different from the RP address. To be specific, the first network device may be an intermediate node, for example, a multicast router.

In an optional embodiment, the method further includes:

establishing, by the first network device, a correspondence between the multicast group and the tunnel from the first network device to the second network device.

Specifically, the first network device establishes the tunnel from the first network device to the second network device, and further needs to establish the correspondence between the multicast group and the tunnel. In a specific implementation, the first network device may add, to the outbound interface list of the multicast forwarding entry, the tunnel from the first network device to the second network device.

In an optional embodiment, the second network device supports the Protocol Independent Multicast-Sparse Mode PIM-SM protocol, and before the second network device sends the first unicast join message based on the join request message, the method further includes:

looking up, by the second network device, a table based on the multicast source address or the RP address, to obtain an address of an upstream neighbor of the second network device; and determining, by the second network device based on the address of the upstream neighbor, whether the upstream neighbor supports the PIM-SM protocol.

The sending, by the second network device, a first unicast join message based on the join request message includes:

if the upstream neighbor does not support the PIM-SM protocol, sending, by the second network device, the first unicast join message.

Specifically, after receiving the join request message, the second network device may first look up the table based on the multicast source address to obtain the address of the upstream neighbor of the second network device. Then, the second network device determines whether the upstream neighbor supports the PIM-SM protocol, to be specific, determines whether the upstream neighbor of the second network device is a PIM-SM neighbor of the second network device. If the upstream neighbor supports the PIM-SM protocol, the second network device may send a multicast join message to the upstream neighbor; or if the upstream neighbor does not support the PIM-SM protocol, the second network device may send the first unicast join message.

It should be understood that, when the second network device sends the first unicast join message, because the upstream neighbor of the second network device does not support the PIM-SM protocol and cannot identify the first unicast join message, the upstream neighbor of the second network device may directly forward the first unicast join message until there is a first node that can identify the first unicast join message, namely, the first network device.

In an optional embodiment, after the first network device establishes the tunnel from the first network device to the second network device based on the first unicast join message, the method further includes:

sending, by the first network device, a first multicast join message, where the first multicast join message is used to request to join the multicast group, a source address of the first multicast join message is the address of the first network device, and a destination address of the first multicast join message is a multicast address of a multicast router.

Specifically, after the first network device establishes the tunnel from the first network device to the second network device, the first network device may further send the first multicast join message upward. The destination address of the first multicast join message is the multicast address of the multicast router. It should be understood that, in specific implementation, the first network device continues to send the first multicast join message upward on the premise that the multicast forwarding entry of the first network device is newly created after the first unicast join message is received, and an upstream neighbor of the first network device is a PIM-SM neighbor of the first network device. However, this is not limited in this embodiment of this application. In a specific implementation, all multicast routers in this network system support the PIM-SM protocol, and the destination address of the first multicast join message is 224.0.0.13.

In an optional embodiment, after the first network device establishes the tunnel from the first network device to the second network device based on the first unicast join message, the method further includes:

sending, by the first network device, a second unicast join message, where the second unicast join message is used to request to join the multicast group, a source address of the second unicast join message is the address of the first network device, and a destination address of the second unicast join message is the multicast source address or the RP address.

Specifically, after the first network device establishes the tunnel from the first network device to the second network device, the first network device may further send the second unicast join message upward. The destination address of the second unicast join message is the multicast source address or the RP address. It should be understood that, in specific implementation, if the multicast forwarding entry of the first network device is newly created after the first unicast join message is received, the first network device needs to continue to send the second unicast join message upward.

In an optional embodiment, the first network device supports the Protocol Independent Multicast-Sparse Mode PIM-SM protocol, and before the first network device sends the second unicast join message, the method further includes:

looking up, by the first network device, a table based on the multicast source address or the RP address, to obtain an address of an upstream neighbor of the first network device; and determining, by the first network device based on the address of the upstream neighbor, whether the upstream neighbor supports the PIM-SM protocol.

The sending, by the first network device, a second unicast join message includes:

if the upstream neighbor does not support the PIM-SM protocol, sending, by the first network device, the second unicast join message.

Specifically, before sending the second unicast join message, the first network device may also determine whether the upstream neighbor of the first network device supports the PIM-SM protocol, to be specific, determine whether the upstream neighbor of the first network device is a PIM-SM neighbor of the first network device. If the upstream neighbor supports the PIM-SM protocol, the first network device may send the first multicast join message to the upstream neighbor; or if the upstream neighbor does not support the PIM-SM protocol, the second network device may send the second unicast join message.

In an optional embodiment, the method further includes:

receiving, by the second network device, a leave request message, where the leave request message is used to request to leave the multicast group, and the leave request message carries the multicast group address;

deleting, by the second network device based on the leave request message and from an outbound interface list of a multicast forwarding entry corresponding to the multicast group address, a physical interface used for receiving the leave request message, and determining whether the outbound interface list is empty; and if the outbound interface list is empty, sending, by the second network device, a first unicast prune message, where the first unicast prune message is used to request to leave the multicast group, a source address of the first unicast prune message is the address of the second network device, and a destination address of the first unicast prune message is the multicast source address or the RP address.

Specifically, after joining the multicast group, the terminal device may send the leave request message to the second network device to request to leave the multicast group. The second network device receives the leave request message, and deletes, from the outbound interface list of the multicast forwarding entry corresponding to the multicast group address carried in the leave request message, the physical interface used for receiving the leave request message.

Further, the second network device may determine whether the outbound interface list is empty. If the outbound interface list is not empty, the second network device performs no processing. If the outbound interface list is empty, the second network device may continue to send the first unicast prune message upward to request to leave the multicast group.

In a possible implementation, the leave request message may be an IGMP leave group message, but this is not limited in this embodiment of this application.

In an optional embodiment, before the second network device sends the first unicast prune message, the method further includes:

looking up, by the second network device, a table based on the multicast source address or the RP address, to obtain an address of an upstream neighbor of the second network device; and determining, by the second network device based on the address of the upstream neighbor, whether the upstream neighbor supports the PIM-SM protocol.

The sending, by the second network device, a first unicast prune message includes:

if the upstream neighbor does not support the PIM-SM protocol, sending, by the second network device, the first unicast prune message.

Specifically, the second network device may first look up the table based on the multicast source address or the RP address to obtain the address of the upstream neighbor of the second network device. Then, the second network device determines whether the upstream neighbor supports the PIM-SM protocol, to be specific, determines whether the upstream neighbor of the second network device is a PIM-SM neighbor of the second network device. If the upstream neighbor supports the PIM-SM protocol, the second network device may send a multicast prune message to the upstream neighbor; or if the upstream neighbor does not support the PIM-SM protocol, the second network device may send the first unicast prune message.

In an optional embodiment, the method further includes:

receiving, by the first network device, a first unicast prune message sent by a third network device, where the first unicast prune message is used to request to leave the multicast group, a source address of the first unicast prune message is an address of the third network device, and a destination address of the first unicast prune message is the multicast source address or the RP address;

determining, by the first network device based on the first unicast prune message, whether there is a first multicast forwarding entry corresponding to information carried in the first unicast prune message;

if there is no first multicast forwarding entry, determining, by the first network device, whether the address of the first network device is the same as the destination address of the first unicast prune message; and if the address of the first network device is the same as the destination address of the first unicast prune message, ignoring, by the first network device, the first unicast prune message; or if the address of the first network device is different from the destination address of the first unicast prune message, continuing, by the first network device, to forward the first unicast prune message based on the destination address of the first unicast prune message.

Specifically, the first network device may receive the first unicast prune message sent by the third network device, and determine, based on the first unicast prune message, whether there is the first multicast forwarding entry. The first multicast forwarding entry corresponds to the information carried in the first unicast prune message. For example, if the first unicast prune message carries a multicast group address the first multicast forwarding entry may be (*, G); or if the first unicast prune message carries a multicast group address G and a multicast source address S, the first multicast forwarding entry may be (S, G).

If there is no first multicast forwarding entry, the first network device determines whether the address of the first network device is the same as the destination address of the first unicast prune message. When the address of the first network device is different from the destination address of the first unicast prune message, the first network device continues to forward the first unicast prune message. It should be understood that, when the address of the first network device is the same as the destination address of the first unicast prune message, because there is no first multicast forwarding entry, it indicates that there is no corresponding branch, the first unicast prune message is sent incorrectly, and the first network device may ignore the first unicast prune message.

It should be understood that the third network device may be the same as the second network device, or may be different from the second network device. This is not limited in this embodiment of this application. If the third network device is the same as the second network device, there is the corresponding first multicast forwarding entry, and a prune process is as follows.

In an optional embodiment, the method further includes:

if there is the first multicast forwarding entry, determining, by the first network device, whether there is a tunnel from the first network device to the third network device; and if there is no tunnel from the first network device to the third network device, deleting, by the first network device from an outbound interface list of the first multicast forwarding entry, a physical interface used for receiving the first unicast prune message; or if there is the tunnel from the first network device to the third network device, tearing down, by the first network device, the tunnel from the first network device to the third network device, and deleting, from an outbound interface list of the first multicast forwarding entry, the tunnel from the first network device to the third network device.

Specifically, when there is the first multicast forwarding entry corresponding to the information carried in the first unicast prune message, the first network device may determine whether there is the tunnel from the first network device to the third network device. If there is no tunnel, the first network device may directly delete, from the outbound interface list of the first multicast forwarding entry, the physical interface used for receiving the first unicast prune message. If there is the tunnel, the first network device needs to tear down the tunnel, and delete the tunnel from the outbound interface list of the first multicast forwarding entry.

In an optional embodiment, the method further includes:

determining, by the first network device, whether the outbound interface list of the first multicast forwarding entry is empty; and if the outbound interface list of the first multicast forwarding entry is empty, deleting, by the first network device, the first multicast forwarding entry.

Specifically, after processing the first unicast prune message, the first network device may further determine whether the outbound interface list of the first multicast forwarding entry is empty. If the outbound interface list is empty, the first network device may delete the first multicast forwarding entry. It should be understood that if the outbound interface list is not empty, it indicates that there is still another branch of the first network device on a corresponding multicast tree, and the first network device performs no processing.

In an optional embodiment, the first network device is not the multicast source or the rendezvous point RP, and the method further includes:

sending, by the first network device, a second unicast prune message, where the second unicast prune message is used to request to leave the multicast group, a source address of the second unicast prune message is the address of the first network device, and a destination address of the second unicast prune message is the multicast source address or the RP address.

Specifically, if the first network device is not the multicast source or the RP, in other words, the first network device is not a root node, after deleting the first multicast forwarding entry, the first network device needs to continue to send the second unicast prune message upward till the multicast source or the RP.

In an optional embodiment, the method further includes:

when the first network device receives a multicast packet, determining, by the first network device, whether there is a second multicast forwarding entry corresponding to a destination address of the multicast packet;

if there is no second multicast forwarding entry, determining, by the first network device, whether the multicast packet has been encapsulated by using a tunnel; and if the multicast packet has not been encapsulated by using the tunnel, sending, by the first network device, a third unicast prune message, where the third unicast prune message is used to request to leave the multicast group, a source address of the third unicast prune message is the address of the first network device, and a destination address of the third unicast prune message is the multicast source address or the RP address; or if the multicast packet has been encapsulated by using the tunnel, sending, by the first network device, a fourth unicast prune message, where the fourth unicast prune message is used to request to leave the multicast group, a source address of the fourth unicast prune message is the address of the first network device, and a destination address of the fourth unicast prune message is a tunnel source address of the tunnel used for encapsulating the multicast packet.

Specifically, after the first network device receives the multicast packet, the first network device may determine, based on the destination address of the multicast packet, whether there is the corresponding second multicast forwarding entry. If there is the corresponding second multicast forwarding entry, the first network device may directly send the multicast packet to a corresponding outbound interface based on an outbound interface list in the second multicast forwarding entry. If there is no corresponding second multicast forwarding entry, the first network device may send a unicast prune message, to request the multicast source to stop sending the multicast packet to the first network device. The first network device may determine whether the multicast packet has been encapsulated by using the tunnel. If the multicast packet has not been encapsulated by using the tunnel, the first network device may send the third unicast prune message whose destination address is the multicast source address or the RP address. If the multicast packet has been encapsulated by using the tunnel, the first network device may send the fourth unicast prune message whose destination address is the tunnel source address of the tunnel used for encapsulating the multicast packet. In this embodiment of this application, sending of the prune message is triggered by using the multicast packet, so that unnecessary multicast packet forwarding can be avoided, thereby reducing overheads.

It should be understood that the destination address of the multicast packet is the multicast group address, and a source address of the multicast packet is the multicast source address or the RP address. For example, if there are one multicast group G and two multicast sources S1 and S2, there may be three entries on one multicast router: (*, G), (S1, G), and (S2, G). A multicast packet whose destination address is G and whose source address is S1 hits two entries: (*, G) and (S1, G). A multicast packet whose destination address is G and whose source address is S2 hits two entries: (*, G) and (S2, G). A multicast packet whose destination address is G and whose source address is RP hits one entry: (*, G).

In an optional embodiment, the first unicast join message is a periodically sent message, and a sending cycle of the first unicast join message is a first time period. The method further includes:

if the first network device does not receive, within the first time period, the first unicast join message sent again by the second network device, tearing down, by the first network device, the tunnel from the first network device to the second network device.

In an optional embodiment, the first unicast join message is a periodically sent message, and a sending cycle of the first unicast join message is a first time period. The method further includes:

if the first network device does not receive, within the first time period, the first unicast join message sent again by the second network device, deleting, by the first network device from an outbound interface list of a corresponding multicast forwarding entry, a previous physical interface used for receiving the first unicast join message.

In this embodiment of this application, the first unicast join message is a periodically sent message. Each time the first network receives the first unicast join message, the first network device refreshes a timer. Duration of the timer is the first time period. If the first unicast join message has not been received when the timer expires, and if the tunnel is established between the first network device and the second network device, the first network device may tear down the established tunnel from the first network device to the second network device. Further, the first network device may delete the tunnel from the first network device to the second network device from the outbound interface list of the multicast forwarding entry. If there is no tunnel between the first network device and the second network device, the first network device may directly delete, from the outbound interface list of the corresponding multicast forwarding entry, the previously stored physical interface used for receiving the first unicast join message.

Figure 3:
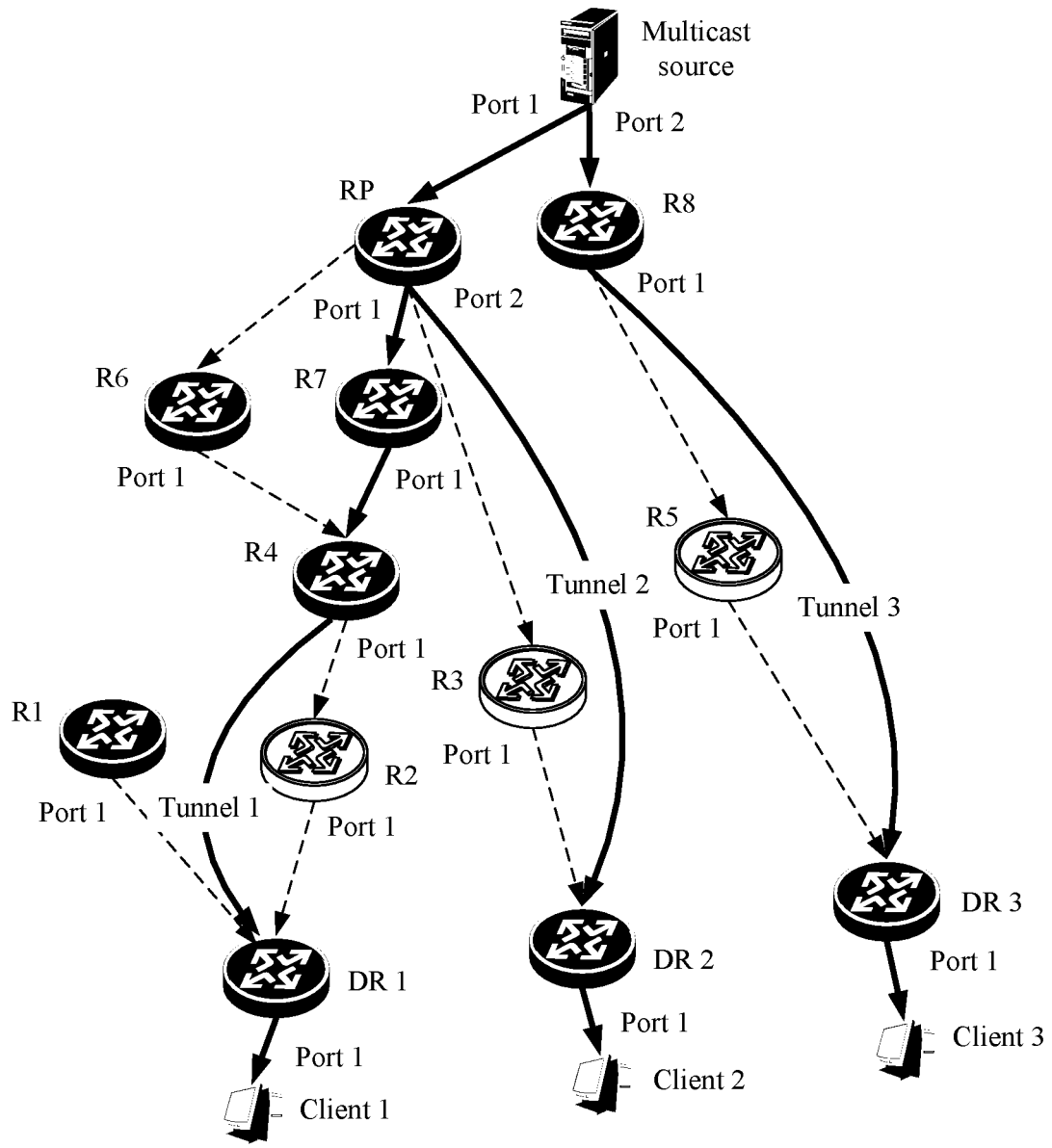
FIG. 3 is a schematic diagram of a tunnel-based network system according to an embodiment of this application.

FIG. 3 is a schematic diagram of another network system according to an embodiment of this application. Unicast addresses of network elements are as follows:

DR 1: 10.9.1.1
DR 2: 10.9.2.1
DR 3: 10.9.3.1
R1: 10.10.1.1
R2 (the PIM-SM is not supported): 10.10.2.1
R3 (the PIM-SM is not supported): 10.10.3.1
R4: 10.10.4.1
R5 (the PIM-SM is not supported): 10.10.5.1
R6: 10.10.6.1
R7 (a fault occurs after a PIM-SM process runs for a period of time): 10.10.7.1
R8: 10.10.8.1
RP: 10.0.0.1
Source: 10.10.10.1

The source has sent multicast content to the RP through a tunnel. The multicast content is sent to a multicast group 224.10.10.10 (namely, a multicast group address). All multicast routers are statically configured with information about the RP. Therefore, this network includes not only a multicast tree SPT that uses the source as a root, but also a multicast tree RPT that uses the RP as a root. In FIG. 3 to FIG. 8, an interface used for receiving a message is referred to as a port, but this is not limited in this embodiment of this application.

The multicast service implementation method in this application is described below in detail with reference to a specific embodiment. In this embodiment of this application, a multicast tree establishment procedure is as follows:

First step: A client 1 joins a multicast tree RPT in a source-specific manner.

1. The client 1 constructs an IGMP membership report message and sends the IGMP membership report message to the DR 1. A type field is 0x16 (Membership Report), the to-be-added multicast group address 224.10.10.10 is filled into a multicast group address field, the multicast source address 10.10.10.1 is filled into a multicast source address (source address) field, and a destination address is 224.0.0.2 (representing multicast addresses of all multicast routers).

2. The DR 1 searches for an MFIB entry by using the multicast group address 224.10.10.10 and the multicast source address 10.10.10.1. If the search misses, the DR 1 creates an MFIB entry, and adds an interface port 1 on which the IGMP membership report message is received to an outbound interface list of the newly created MFIB entry.

3. The DR 1 constructs a first unicast join message, where a destination address of the first unicast join message is the address 10.0.0.1 of the RP, and a source address is the address 10.9.1.1 of the DR 1. A time to live TTL field is initialized to 255. In addition, the DR 1 fills the multicast group address in the IGMP membership report message into a multicast group address field of the first unicast join message, and fills the multicast source address in the IGMP membership report message into a joined source address field of the first unicast join message.

4. The R2 is a common unicast router, does not identify the first unicast join message, and directly forwards the first unicast join message.

5. The R4 receives the first unicast join message, and searches for an MFIB entry by using the multicast group address 224.10.10.10 and the multicast source address 10.10.10.1. If the search misses, the R4 creates an MFIB entry.

6. The R4 checks the TTL field of the unicast join message. Because the TTL is 254, a tunnel, i.e., tunnel 1, from the R4 to the source address 10.9.1.1 (namely, the DR 1) of the message is established. A source address of the tunnel is the address 10.10.4.1 of the R4, and a destination address is the address 10.9.1.1 of the DR 1. The R4 adds the tunnel to an outbound interface list of the newly created MFIB entry.

7. The R4 continues to send a second unicast join message to an upstream, where a destination address of the second unicast join message is the address 10.0.0.1 of the RP, and a source address is the address 10.10.4.1 of the R4. A TTL is initialized to 255. The R4 fills the multicast group address into a multicast group address field of the second unicast join message, and fills the multicast source address into a joined source address field of the second unicast join message.

8. The R7 receives the second unicast join message, and searches for an MFIB entry by using the multicast group address 224.10.10.10 and the multicast source address 10.10.10.1. If the search misses, the R7 creates an MFIB entry.

9. The R7 checks the TTL field of the second unicast join message. Because the TTL is 255, the R7 adds the interface port 1 on which the message is received to an outbound interface list of the newly created MFIB entry.

10. The R7 continues to send a third unicast join message to an upstream, where a destination address of the third unicast join message is the address 10.0.0.1 of the RP, and a source address is the address 10.10.7.1 of the R7. A TTL is initialized to 255. The R7 fills the multicast group address into a multicast group address field of the third unicast join message, and fills the multicast source address into a joined source address field of the third unicast join message.

11. The RP receives the third unicast join message, and searches for an MFIB entry by using the multicast group address 224.10.10.10 and the multicast source address 10.10.10.1. If the search misses, the RP creates an MFIB entry.

12. The RP checks the TTL field of the third unicast join message. Because the TTL is 255, the RP adds the interface port 1 on which the message is received to an outbound interface list of the newly created MFIB entry.

Figure 4:
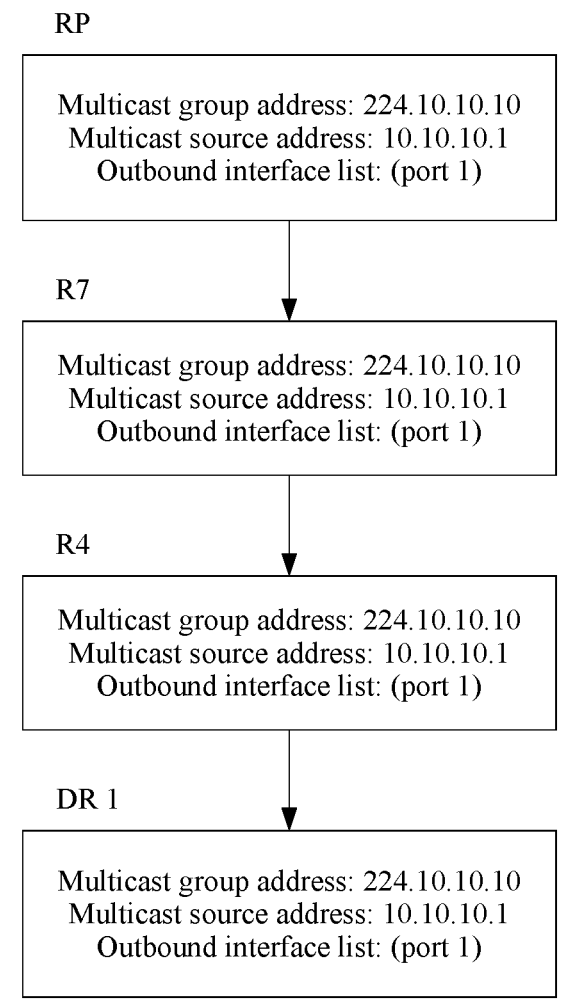
FIG. 4 is a schematic diagram of a multicast tree branch according to an embodiment of this application.

As shown in FIG. 4, after the foregoing process, the client 1 has joined the multicast tree RPT that uses the RP as a root.

Second step: A client 2 joins the multicast tree RPT in a source-specific manner.

1. The client 2 constructs an IGMP membership report message and sends the IGMP membership report message to the DR 2. A type field is 0x16 (Membership Report), the to-be-added multicast group address 224.10.10.10 is filled into a group address field, the multicast source address 10.10.10.1 is filled into a source address field, and a destination address is 224.0.0.2 (representing multicast addresses of all multicast routers).

2. The DR 2 searches for an MFIB entry by using the multicast group address 224.10.10.10 and the multicast source address 10.10.10.1. If the search misses, the DR 2 creates an MFIB entry, and adds an interface port 1 on which the IGMP membership report message is received to an outbound interface list of the newly created MFIB entry.

3. The DR 2 constructs a fourth unicast join message, where a destination address of the message is the address 10.0.0.1 of the RP, and a source address is the address 10.9.2.1 of the DR 2. The DR 2 fills the multicast group address in the IGMP membership report message into a multicast group address field of the fourth unicast join message, and fills the multicast source address in the IGMP membership report message into a joined source address field of the fourth unicast join message.

4. The R3 is a common unicast router, does not identify the fourth unicast join message, and directly forwards the message.

5. The RP receives the fourth unicast join message, and searches for an MFIB entry by using the multicast group address 224.10.10.10 and the multicast source address 10.10.10.1. The search hits the MFIB entry.

6. The RP checks a TTL field of the fourth unicast join message. Because the TTL is 254, a tunnel, i.e., tunnel 2, from the RP to the source address 10.9.2.1 (namely, the DR 2) of the message is established. A source address of the tunnel is the address 10.0.0.1 of the RP, and a destination address is the address 10.9.2.1 of the DR 2. The RP adds the tunnel to an outbound interface list of the MFIB entry.

Figure 5:
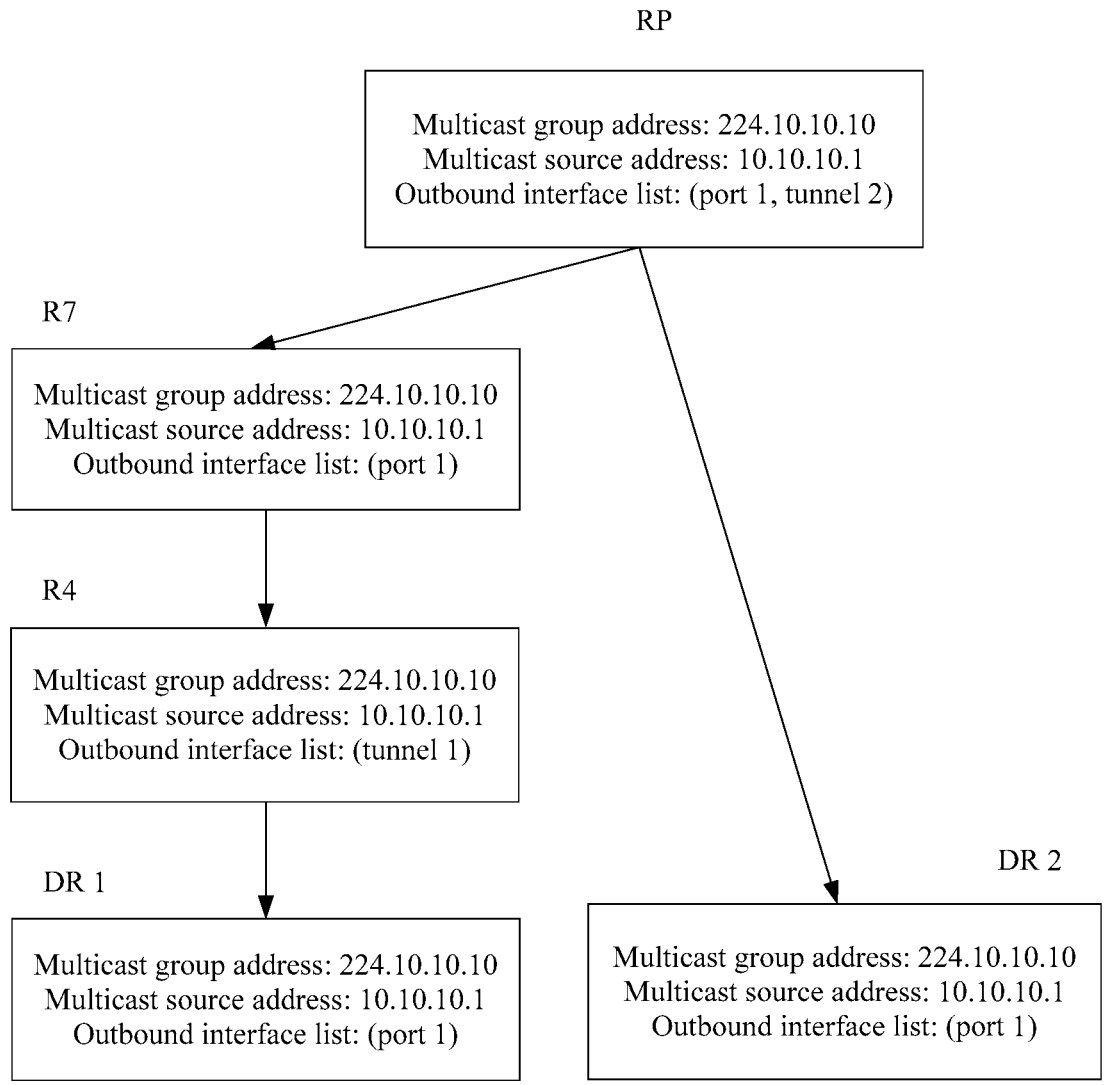
FIG. 5 is a schematic diagram of another multicast tree branch according to an embodiment of this application.
Figure 7:
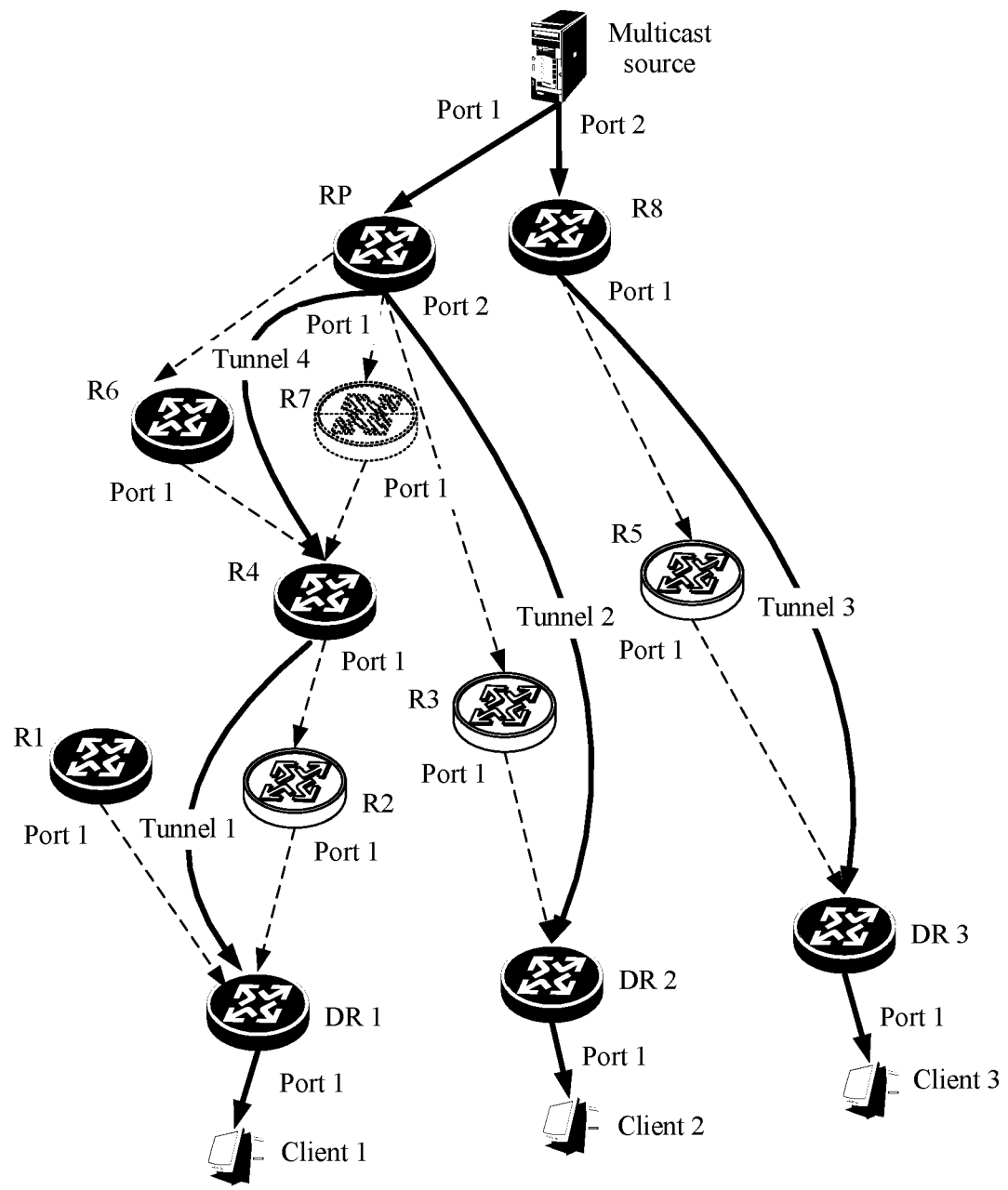
FIG. 7 is a schematic diagram of another tunnel-based network system according to an embodiment of this application.

As shown in FIG. 5, after the foregoing process, the client 2 has joined the multicast tree RPT that uses the RP as the root.

Third step: A client 3 joins a multicast tree SPT.

1. The client 3 constructs an IGMP membership report message and sends the IGMP membership report message to the DR 3. A type field is 0x16 (Membership Report), the to-be-added multicast group address 224.10.10.10 is filled into a group address field, the multicast source address 10.10.10.1 is filled into a source address field, and a destination address is 224.0.0.2 (representing multicast addresses of all multicast routers).

2. The DR 3 searches for an MFIB entry by using the multicast group address 224.10.10.10 and the multicast source address 10.10.10.1. If the search misses, the DR 3 creates an MFIB entry, and adds an interface port 1 on which the IGMP membership report message is received to an outbound interface list of the newly created MFIB entry.

3. The DR 3 constructs a fifth unicast join message, where a destination address of the fifth unicast join message is the multicast source address 10.10.10.1, and a source address is the address 10.9.3.1 of the DR 3. A time to live TTL field is initialized to 255. In addition, the DR 3 fills the multicast group address in the IGMP membership report message into a multicast group address field of the fifth unicast join message.

4. The R5 is a common unicast router, does not identify the fifth unicast join message, and directly forwards the message.

5. The R8 receives the fifth unicast join message, and searches for an MFIB entry by using the multicast group address 224.10.10.10 and the multicast source address 10.10.10.1. If the search misses, the R8 creates an MFIB entry.

6. The R8 checks a TTL field of the fifth unicast join message. Because the TTL is 254, a tunnel, i.e., tunnel 3, from the R8 to the source address 10.9.3.1 (namely, the DR 3) of the message is established. A source address of the tunnel is the address 10.10.8.1 of the R8, and a destination address is the address 10.9.3.1 of the DR 3. The R8 adds the tunnel to an outbound interface list of the newly created MFIB entry.

7. A process of adding the R8 to the source is similar to the foregoing process, and details are not described herein again.

As shown in FIG. 6, after the foregoing process, the client 3 has joined the multicast tree SPT that uses the source as a root. In this case, the client 1, the client 2, and the client 3 all join the multicast group, and a multicast packet may be forwarded along a path indicated by a solid line in FIG. 3, to each client.

In actual application, a PIM-SM process of a router may be faulty, thereby interrupting a multicast service of a client corresponding to the router. An example in which a PIM-SM process of the R7 is faulty is used for description below.

Fourth step: A PIM-SM process of the R7 is faulty.

1. The R4 periodically sends a second unicast join message, where a destination address of the second unicast join message is the address 10.0.0.1 of the RP, and a source address is the address 10.10.4.1 of the R4. A TTL is initialized to 255. The R4 fills the multicast group address into a multicast group address field of the second unicast join message, and fills the multicast source address into a joined source address field of the second unicast join message.

2. After the PIM-SM process of the R7 is faulty, the R7 is degenerated into a unicast router, does not identify the second unicast join message, and directly forwards the second unicast join message.

3. The RP receives the second unicast join message, and searches for an MFIB entry by using the multicast group address 224.10.10.10 and the multicast source address 10.10.10.1. The search hits the MFIB entry.

4. The RP checks the TTL field of the second unicast join message. Because the TTL is 254, a tunnel, i.e., tunnel 4, from the RP to the source address 10.10.4.1 (namely, the R4) of the message is established. A source address of the tunnel is the address 10.0.0.1 of the RP, and a destination address is the address 10.10.4.1 of the R4. The RP adds the tunnel to an outbound interface list of the MFIB entry.

5. After the PIM-SM process of the R7 is faulty, the R7 no longer sends the third unicast join message to the RP. Therefore, after timeout, the RP deletes the port 1 from the outbound interface list of the MFIB entry.

Figure 8:
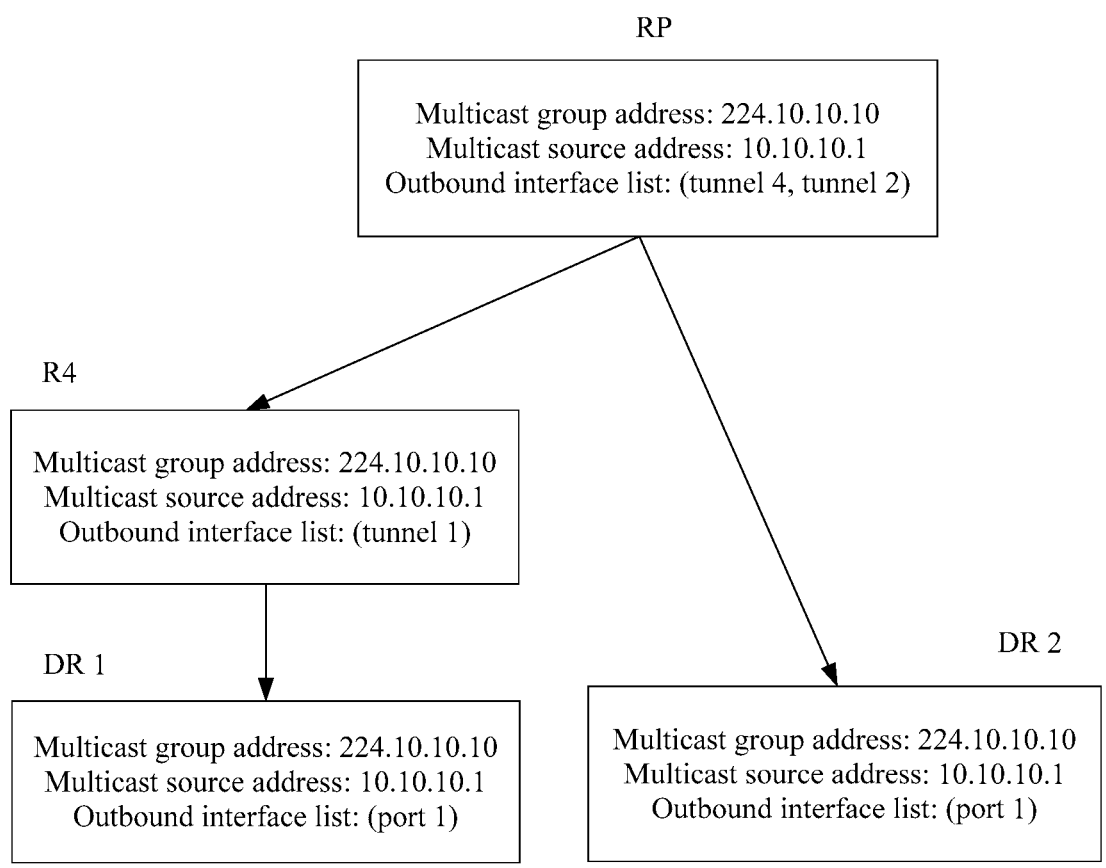
FIG. 8 is a schematic diagram of another multicast tree branch according to an embodiment of this application.

After the foregoing steps, the tunnel from the R4 to the RP is successfully established while skipping the faulty device R7. As shown in FIG. 8, a multicast packet may be forwarded along a path indicated by a solid line in FIG. 7, and a multicast service is not affected. Therefore, in this embodiment of this application, a tunnel used for multicast can be established when a router that supports a multicast routing protocol is faulty, so that a multicast service is not interrupted, and reliability of the multicast service is improved.

Fifth step: The PIM-SM process of the R7 is recovered.

1. The R4 periodically sends a second unicast join message, where a destination address of the second unicast join message is the address 10.0.0.1 of the RP, and a source address is the address 10.10.4.1 of the R4. A TTL is initialized to 255. The R4 fills the multicast group address into a multicast group address field of the second unicast join message, and fills the multicast source address into a joined source address field of the second unicast join message.

2. After the PIM-SM process of the R7 is recovered, the R7 can identify the second unicast join message, and searches for an MFIB entry by using the multicast group address 224.10.10.10 and the multicast source address 10.10.10.1. If the search misses, the R7 creates a new MFIB entry.

3. The R7 checks the TTL field of the second unicast join message. Because the TTL is 255, the R7 adds the interface port 1 on which the message is received to an outbound interface list of the MFIB entry.

4. The R7 continues to send a third unicast join message to an upstream, where a destination address of the third unicast join message is the address 10.0.0.1 of the RP, and a source address is the address 10.10.7.1 of the R7. A TTL is initialized to 255. The R7 fills the multicast group address into a multicast group address field of the third unicast join message, and fills the multicast source address into a joined source address field of the third unicast join message.

5. The RP receives the third unicast join message, and searches for an MFIB entry by using the multicast group address 224.10.10.10 and the multicast source address 10.10.10.1. The search hits the MFIB entry.

6. The RP checks the TTL field of the third unicast join message. Because the TTL is 255, the RP adds the interface port 1 on which the message is received to an outbound interface list of the newly created MFIB entry.

7. Because the RP no longer receives the second unicast join message sent by the R4, after timeout, the tunnel 4 is deleted from the outbound interface list, and the tunnel 4 is torn down.

It should be understood that although the PIM-SM process of the R7 is faulty, the R7 may still normally forward a message. If an entire system of the R7 is faulty, a unicast join message sent by the R4 cannot be forwarded by using the R7. A fault on the R7 may trigger convergence of a unicast routing protocol, and the R6 is connected to the RP by using a link. Therefore, the unicast routing protocol may change, to the address of the R6, a next-hop address of a router that is on the R4 and whose destination address is the RP. In this case, after convergence of the unicast routing protocol is completed, the second unicast join message sent by the R4 may be forwarded to the RP by using the R6, so that the R4 joins the multicast tree.

Sixth step: The client 1 cancels on-demand (to be specific, exits from the multicast tree).

1. The client 1 sends an IGMP leave group message to the DR 1, where the message carries the multicast group address 224.10.10.10 and the multicast source address 10.10.10.1.

2. The DR 1 receives the IGMP leave group message sent by the client 1, determines a corresponding MFIB entry based on the multicast group address 224.10.10.10 and the multicast source address 10.10.10.1, and deletes, from the MFIB entry, an interface used for receiving the message.

Further, the DR 1 determines whether the MFIB entry is empty. If the MFIB entry is empty, the DR 1 deletes the MFIB entry, constructs a first unicast prune message, and sends the first unicast prune message. A destination address of the first unicast prune message is the address 10.0.0.1 of the RP, and a source address is the address 10.9.1.1 of the DR 1. The DR 1 fills the multicast group address in the IGMP message into a multicast group address field of the first unicast prune message, and fills the multicast source address in the IGMP message into a pruned source address field of the first unicast prune message.

3. The R2 is a common unicast router, does not identify the first unicast prune message, and directly forwards the message.

4. The R4 receives the first unicast prune message, and searches for the MFIB entry by using the multicast group address 224.10.10.10 and the multicast source address 10.10.10.1. The search hits. The R4 searches for a tunnel at the source address 10.9.1.1 of the first unicast prune message, obtains the tunnel 1, deletes the tunnel from an outbound interface list of the MFIB entry, and tears down the tunnel.

5. Because the outbound interface list of the MFIB entry is empty, the R4 deletes the MFIB entry, and continues to construct a second unicast prune message and sends the second unicast prune message to an upstream.

6. A subsequent procedure of sending and processing the second unicast prune message is the same as the foregoing procedure, and details are not described herein again.

After the foregoing steps, a branch of the established multicast tree RPT shown in FIG. 4 is deleted. However, in a process of performing the sixth step, a router may be faulty. This causes a packet loss of a unicast prune message. An example in which the R2 is faulty is used for description below.

Seventh step: The client 1 fails to cancel on-demand.

1. After receiving the IGMP leave group message sent by the client 1, the DR 1 constructs and sends the first unicast prune message. The R2 is a common unicast router, does not identify the first unicast prune message, and directly forwards the message. In this case, a packet loss of the first unicast prune message is caused due to a fault on the R2.

2. The R4 fails to receive the first unicast prune message, and therefore continues to replicate a multicast packet to the DR 1.

3. The DR 1 receives the multicast packet, does not find a corresponding MFIB entry, and determines that the first unicast prune message previously sent by the DR 1 is not correctly received and processed by the upstream. Therefore, the DR 1 reconstructs a first unicast prune message and resends the first unicast prune message. Because the multicast packet is from the tunnel from the R4 to the DR 1, the destination address of the first unicast prune message is the address 10.10.4.1 of the R4, and the source address of the message is the address 10.9.1.1 of the DR 1. The DR 1 fills a multicast group address in the multicast packet into the multicast group address field of the first unicast prune message.

4. The R4 receives the first unicast prune message, and searches for the MFIB entry by using the multicast group address 224.10.10.10. The search hits. The R4 searches for a tunnel at the source address 10.9.1.1 of the first unicast prune message, obtains the tunnel 1, deletes the tunnel from the outbound interface list of the MFIB entry, and tears down the tunnel.

5. Because the outbound interface list of the MFIB entry is empty, the R4 deletes the MFIB entry, and continues to construct a second unicast prune message and sends the second unicast prune message to an upstream.

6. A subsequent procedure of sending and processing the second unicast prune message is the same as the foregoing procedure, and details are not described herein again.

In this embodiment of this application, a unicast join message is introduced, so that a tunnel is automatically established to connect a local router and a remote multicast router discovered by using the unicast join message. In this way, a unicast network is automatically traversed, thereby improving availability of a multicast service. In addition, after any multicast router is faulty, a unicast join process is initiated again to find another closest multicast router to restore the service. This greatly improves reliability of the multicast service.

The multicast service implementation method in this application is described below in detail with reference to another specific embodiment. In this embodiment of this application, a multicast tree establishment procedure is as follows:

First step: A client 1 joins a multicast tree RPT in a source-specific manner.

1. The client 1 constructs an IGMP membership report message and sends the IGMP membership report message to the DR 1. A type field is 0x16 (Membership Report), the to-be-added multicast group address 224.10.10.10 is filled into a group address field, the multicast source address 10.10.10.1 is filled into a source address field, and a destination address is 224.0.0.2 (representing multicast addresses of all multicast routers).

2. The DR 1 searches for an MFIB entry by using the multicast group address 224.10.10.10 and the multicast source address 10.10.10.1. If the search misses, the DR 1 creates an MFIB entry, and adds an interface port 1 on which the IGMP membership report message is received to an outbound interface list of the newly created MFIB entry.

3. The DR 1 searches for the corresponding address 10.0.0.1 of the RP by using the multicast group address 224.10.10.10 in the IGMP membership report message, and then searches an MRIB table by using the address 10.0.0.1 of the RP to obtain the address 10.10.2.1 of an upstream neighbor R2. The DR 1 finds that the R2 is not a PIM-SM neighbor of the DR 1, and constructs a first unicast join message. A destination address is the address 10.0.0.1 of the RP, and a source address is the address 10.9.1.1 of the DR 1. The DR 1 fills the multicast group address into a multicast group address field of the first unicast join message, and fills the multicast source address into a joined source address field of the first unicast join message.

4. The R2 is a common unicast router, does not identify the first unicast join message, and directly forwards the message.

5. The R4 receives the first unicast join message, and searches for an MFIB entry by using the multicast group address 224.10.10.10 and the multicast source address 10.10.10.1. If the search misses, the R4 creates an MFIB entry. Because a unicast join message is received, the R4 establishes a tunnel, i.e., tunnel 1, from the R4 to the source address 10.9.1.1 (namely, the DR 1) of the unicast message. A source address of the tunnel is the address 10.10.4.1 of the R4, and a destination address is the address 10.9.1.1 of the DR 1. The R4 adds the tunnel to an outbound interface list of the newly created MFIB entry.

6. The R4 searches an MRIB table by using the address 10.0.0.1 of the RP to obtain a next-hop address 10.10.7.1 of the R7. The R4 finds that the R7 is a PIM-SM neighbor, and constructs a first multicast join message. A destination address is a multicast address 224.0.0.13 of a PIM-SM router, and a source address is the address 10.10.4.1 of the R4. The R4 fills the address 10.10.7.1 of the R7 into an upstream neighbor address field of the first multicast join message, fills the multicast group address into a multicast group address field of the first multicast join message, and fills the multicast source address into a joined source address field of the first multicast join message.

7. The R6 receives the first multicast join message, and compares the upstream neighbor address field in the message with the address 10.10.6.1 of the R6. If the upstream neighbor address field in the message is different from the address 10.10.6.1 of the R6, the R6 ignores the message.

8. The R7 receives the first multicast join message, and compares the upstream neighbor address field in the message with the address 10.10.7.1 of the R7. If the upstream neighbor address field in the message is the same as the address 10.10.7.1 of the R7, the R7 processes the message. The R7 searches for an MFIB entry by using the multicast group address 224.10.10.10 and the multicast source address 10.10.10.1. If the search misses, the R7 creates an MFIB entry. Because a multicast join message is received, the R7 adds the interface port 1 on which the message is received to an outbound interface list of the newly established MFIB entry.

9. The R7 continues to send a second multicast join message to an upstream and ends this process after repeating steps 6 to 8.

As shown in FIG. 4, after the foregoing process, the client 1 has joined the multicast tree RPT that uses the RP as a root.

Second step: A client 2 joins the multicast tree RPT in a source-specific manner.

1. The client 2 constructs an IGMP membership report message and sends the IGMP membership report message to the DR 2. A type field is 0x16 (Membership Report), the to-be-added multicast group address 224.10.10.10 is filled into a group address field, the multicast source address 10.10.10.1 is filled into a source address field, and a destination address is 224.0.0.2 (representing multicast addresses of all multicast routers).

2. The DR 2 searches for an MFIB entry by using the multicast group address 224.10.10.10 and the multicast source address 10.10.10.1. If the search misses, the DR 2 creates an MFIB entry, and adds an interface port 1 on which the IGMP membership report message is received to an outbound interface list of the newly created MFIB entry.

3. The DR 2 searches for the corresponding address 10.0.0.1 of the RP by using the multicast group address 224.10.10.10 in the IGMP membership report message, and then searches an MRIB table by using the address 10.0.0.1 of the RP to obtain the address 10.10.3.1 of an upstream neighbor R3. The DR 2 finds that the R3 is not a PIM-SM neighbor, and constructs a fourth unicast join message. A destination address of the message is the address 10.0.0.1 of the RP, and a source address is the address 10.9.2.1 of the DR 2. The DR 2 fills the multicast group address in the IGMP membership report message into a multicast group address field of the fourth unicast join message, and fills the multicast source address in the IGMP membership report message into a joined source address field of the fourth unicast join message.

4. The R3 is a common unicast router, does not identify the fourth unicast join message, and directly forwards the message.

5. The RP receives the fourth unicast join message, and searches for an MFIB entry by using the multicast group address 224.10.10.10 and the multicast source address 10.10.10.1. The search hits the MFIB entry. Because a unicast join message is received, the RP establishes a tunnel, i.e., tunnel 2, from the RP to the source address 10.9.2.1 (namely, the DR 2) of the unicast message. A source address of the tunnel is the address 10.0.0.1 of the RP, and a destination address is the address 10.9.2.1 of the DR 2. The RP adds the tunnel to an outbound interface list of the MFIB entry.

As shown in FIG. 5, after the foregoing process, the client 2 has joined the multicast tree RPT that uses the RP as the root.

Third step: A client 3 joins a multicast tree SPT.

1. The client 3 constructs an IGMP membership report message and sends the IGMP membership report message to the DR 3. A type field is 0x16 (Membership Report), the to-be-added multicast group address 224.10.10.10 is filled into a group address field, the multicast source address 10.10.10.1 is filled into a source address field, and a destination address is 224.0.0.2 (representing multicast addresses of all multicast routers).

2. The DR 3 searches for an MFIB entry by using the multicast group address 224.10.10.10 and the multicast source address 10.10.10.1. If the search misses, the DR 3 creates an MFIB entry, and adds an interface port 1 on which the IGMP membership report message is received to an outbound interface list of the newly created MFIB entry.

3. Because the DR 3 joins the SPT, the DR 3 searches the MRIB entry by using the multicast source address 10.10.10.1 to obtain the address 10.10.5.1 of the upstream neighbor R5. The DR 3 finds that the R5 is not a PIM-SM neighbor, and constructs a fifth unicast join message, where a destination address of the fifth unicast join message is the multicast source address 10.10.10.1, and a source address is the address 10.9.3.1 of the DR 3. A time to live TTL field is initialized to 255. In addition, the DR 3 fills the multicast group address in the IGMP membership report message into a multicast group address field of the fifth unicast join message.

4. The R5 is a common unicast router, does not identify the fifth unicast join message, and directly forwards the message.

5. The R8 receives the fifth unicast join message, and searches for an MFIB entry by using the multicast group address 224.10.10.10 and the multicast source address 10.10.10.1. If the search misses, the R8 creates an MFIB entry. Because a unicast join message is received, the R8 establishes a tunnel, i.e., tunnel 3, from the R8 to the source address 10.9.3.1 (namely, the DR 3) of the unicast message. A source address of the tunnel is the address 10.10.8.1 of the R8, and a destination address is the address 10.9.3.1 of the DR 3. The R8 adds the tunnel to an outbound interface list of the newly created MFIB entry.

6. A process of adding the R8 to the source is similar to the foregoing process, and details are not described again.

As shown in FIG. 6, after the foregoing process, the client 3 has joined the multicast tree SPT that uses the source as a root. In this case, the client 1, the client 2, and the client 3 all join the multicast group, and a multicast packet may be forwarded along a path indicated by a solid line in FIG. 3, to each client.

In actual application, a PIM-SM process of a router may be faulty, thereby interrupting a multicast service of a client corresponding to the router. An example in which a PIM-SM process of the R7 is faulty is used for description below.

Fourth step: A PIM-SM process of the R7 is faulty.

1. The R4 searches an MRIB table by using the address 10.0.0.1 of the RP to obtain the address 10.10.7.1 of an upstream neighbor R7. Because the R4 finds that the R7 is not a PIM-SM neighbor, the R4 constructs a second unicast join message. A destination address of the second unicast join message is the address 10.0.0.1 of the RP, and a source address is the address 10.10.4.1 of the R4. A TTL is initialized to 255. The R4 fills the multicast group address into a multicast group address field of the second unicast join message, and fills the multicast source address into a joined source address field of the second unicast join message.

2. After the PIM-SM process of the R7 is faulty, the R7 is degenerated into a unicast router, does not identify the second unicast join message, and directly forwards the message.

3. The RP receives the second unicast join message, and searches for an MFIB entry by using the multicast group address 224.10.10.10 and the multicast source address 10.10.10.1. The search hits the MFIB entry. Because a unicast join message is received, the RP establishes a tunnel, i.e., tunnel 4, from the RP to the source address 10.10.4.1 (namely, the R4) of the unicast message. A source address of the tunnel is the address 10.0.0.1 of the RP, and a destination address is the address 10.10.4.1 of the R4. The RP adds the tunnel to an outbound interface list of the MFIB entry.

4. After the PIM-SM process of the R7 is faulty, the R7 no longer sends a multicast join message to the RP. Therefore, after timeout, the RP deletes the port 1 from the outbound interface list of the MFIB entry.

After the foregoing steps, the tunnel from the R4 to the RP is successfully established while skipping the faulty device R7. As shown in FIG. 8, a multicast packet may be forwarded along a path indicated by a solid line in FIG. 7, and a multicast service is not affected. Therefore, in this embodiment of this application, a tunnel used for multicast can be established when a router that supports a multicast routing protocol is faulty, so that a multicast service is not interrupted, and reliability of the multicast service is improved.

Fifth step: The PIM-SM process of the R7 is recovered.

1. After the PIM-SM process of the R7 is recovered, the R7 automatically establishes a PIM-SM neighbor relationship with the R4 and the RP.

2. The R4 finds that the R7 is a PIM-SM neighbor, and constructs a first multicast join message. A destination address is a multicast address 224.0.0.13 of a PIM-SM router, and a source address is the address 10.10.4.1 of the R4. The R4 fills the address 10.10.7.1 of the R7 into an upstream neighbor address field of the first multicast join message, fills the multicast group address into a multicast group address field of the first multicast join message, and fills the multicast source address into a joined source address field of the first multicast join message.

3. The R6 receives the first multicast join message, and compares the upstream neighbor address field in the message with the address 10.10.6.1 of the R6. If the upstream neighbor address field in the message is different from the address 10.10.6.1 of the R6, the R6 ignores the message.

4. The R7 receives the first multicast join message, and compares the upstream neighbor address field in the message with the address 10.10.7.1 of the R7. If the upstream neighbor address field in the message is the same as the address 10.10.7.1 of the R7, the R7 processes the message. The R7 searches for an MFIB entry by using the multicast group address 224.10.10.10 and the multicast source address 10.10.10.1. If the search misses, the R7 creates an MFIB entry. Because a multicast join message is received, the R7 adds the interface port 1 on which the message is received to an outbound interface list of the newly established MFIB entry.

5. The R7 continues to send a second multicast join message to an upstream. A destination address is 224.0.0.13, and a source address is the address 10.10.7.1 of the R7. The R7 fills the address 10.0.0.1 of the RP into an upstream neighbor address field of the second multicast join message, fills the multicast group address into a multicast group address field of the second multicast join message, and fills the multicast source address into a joined source address field of the multicast join message.

6. The RP receives the multicast join message, and compares the upstream neighbor address field in the message with the address 10.0.0.1 of the RP. If the upstream neighbor address field in the message is the same as the address 10.0.0.1 of the RP, the RP processes the message. The RP searches for an MFIB entry by using the multicast group address 224.10.10.10 and the multicast source address 10.10.10.1. The search hits the MFIB entry. Because a multicast join message is received, the RP adds the interface port 1 on which the message is received to an outbound interface list of the newly established MFIB entry.

7. Because the R4 no longer sends the second unicast join message to the RP, after timeout, the RP deletes the tunnel 1 from the outbound interface list, and tears down the tunnel 1 tunnel.

It should be understood that although the PIM-SM process of the R7 is faulty, the R7 may still normally forward a message. If an entire system of the R7 is faulty, a unicast join message sent by the R4 cannot be forwarded by using the R7. A fault on the R7 may trigger convergence of a unicast routing protocol, and the R6 is connected to the RP by using a link. Therefore, the unicast routing protocol may change, to the address of the R6, a next-hop address of a router that is on the R4 and whose destination address is the RP. In this case, after convergence of the unicast routing protocol is completed, the second unicast join message sent by the R4 may be forwarded to the RP by using the R6, so that the R4 joins the multicast tree.

Sixth step: The client 1 cancels on-demand (to be specific, exits from the multicast tree).

1. The client 1 sends an IGMP leave group message to the DR 1, where the message carries the multicast group address 224.10.10.10 and the multicast source address 10.10.10.1.

2. The DR 1 receives the IGMP leave group message sent by the client 1, determines a corresponding MFIB entry based on the multicast group address 224.10.10.10 and the multicast source address 10.10.10.1, and deletes, from the MFIB entry, an interface used for receiving the message.

Further, the DR 1 determines whether the MFIB entry is empty. If the MFIB entry is empty, the DR 1 deletes the MFIB entry, and constructs a prune message. Specifically, the DR 1 searches for the corresponding address 10.0.0.1 of the RP by using the multicast group address 224.10.10.10 in the IGMP leave group message, and searches an MRIB table by using the address 10.0.0.1 of the RP to obtain the address 10.10.2.1 of an upstream neighbor R2.

The DR 1 determines that the R2 is not a PIM-SM neighbor, and constructs a first unicast prune message. A destination address is the address 10.0.0.1 of the RP, and a source address is the address 10.9.1.1 of the DR 1. The DR 1 fills the multicast group address in the IGMP leave group message into a multicast group address field of the first unicast prune message, and fills the multicast source address in the IGMP leave group message into a pruned source address field of the first unicast prune message.

3. The R2 is a common unicast router, does not identify the first unicast prune message, and directly forwards the message.

4. The R4 receives the first unicast prune message, and searches for the MFIB entry by using the multicast group address 224.10.10.10 and the multicast source address 10.10.10.1. The search hits. The R4 searches for a tunnel at the source address 10.9.1.1 of the first unicast prune message, obtains the tunnel 1, deletes the tunnel from the outbound interface list of the MFIB entry, and tears down the tunnel.

5. Because the outbound interface list of the MFIB entry is empty, the R4 deletes the MFIB entry, and continues to construct a second unicast prune message and sends the second unicast prune message to an upstream.

6. A subsequent procedure of sending and processing the second unicast prune message is the same as the foregoing procedure, and details are not described herein again.

After the foregoing steps, a branch of the established multicast tree RPT shown in FIG. 4 is deleted. However, in a process of performing the sixth step, a router may be faulty, which causes a packet loss of a unicast prune message. In this embodiment of this application, a procedure in which the client 1 fails to cancel on-demand is the same as that in the previous embodiment. Therefore, details are not described herein again.

In this embodiment of this application, a unicast join message is introduced, so that a tunnel is automatically established to connect a local router and a remote multicast router discovered by using the unicast join message. In this way, a unicast network is automatically traversed, thereby improving availability of a multicast service. In addition, after any multicast router is faulty, a unicast join process is initiated again to find another closest multicast router to restore the service. This greatly improves reliability of the multicast service.

It should be understood that, sequence numbers of the foregoing processes do not mean execution sequences. The execution sequences of the processes should be determined based on functions and internal logic of the processes, and should not constitute any limitation on an implementation process of this embodiment of this application.

The multicast service implementation method according to the embodiments of this application is described in detail above with reference to FIG. 1 to FIG. 8. Multicast service implementation apparatuses according to the embodiments of this application are described in detail below with reference to FIG. 9 and FIG. 12.

Figure 9:
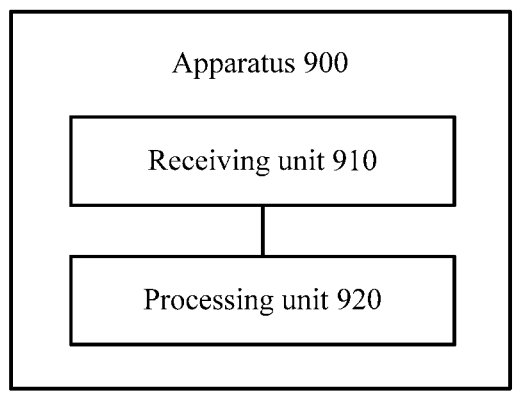
FIG. 9 is a schematic block diagram of a multicast service implementation apparatus according to an embodiment of this application.

FIG. 9 shows a multicast service implementation apparatus 900 according to an embodiment of this application. The apparatus 900 includes:

a receiving unit 910, configured to receive a first unicast join message sent by a second network device, where the first unicast join message is used to request to join a multicast group, a source address of the first unicast join message is an address of the second network device, and a destination address of the first unicast join message is a multicast source address or a rendezvous point RP address; and a processing unit 920, configured to establish a tunnel from the apparatus to the second network device based on the first unicast join message.

According to the multicast service implementation apparatus in this embodiment of this application, the unicast join message is introduced, and a remote multicast router that captures the unicast join message can automatically establish a tunnel to connect to a local router, to automatically traverse a unicast network. In this way, a multicast router whose next-hop router does not support a multicast routing protocol can join the multicast group, thereby helping improve availability of a multicast service.

Optionally, the processing unit 920 is further configured to: before establishing the tunnel from the apparatus to the second network device based on the first unicast join message, determine, based on a first field carried in the first unicast join message, whether the second network device is a neighboring node of the apparatus, where each time the first unicast join message is forwarded by one network device, a value of the first field is subtracted by 1; and if the second network device is not the neighboring node of the apparatus, establish the tunnel from the apparatus to the second network device.

Optionally, when the destination address of the first unicast join message is the multicast source address, an address of the apparatus is different from the multicast source address; or when the destination address of the first unicast join message is the RP address, an address of the apparatus is different from the RP address.

Optionally, the processing unit 920 is further configured to establish a correspondence between the multicast group and the tunnel from the apparatus to the second network device.

Optionally, the apparatus further includes a sending unit, configured to: after the tunnel from the apparatus to the second network device is established based on the first unicast join message, send a first multicast join message, where the first multicast join message is used to request to join the multicast group, a source address of the first multicast join message is the address of the apparatus, and a destination address of the first multicast join message is a multicast address of a multicast router.

Optionally, the apparatus further includes a sending unit, configured to: after the tunnel from the apparatus to the second network device is established based on the first unicast join message, send a second unicast join message, where the second unicast join message is used to request to join the multicast group, a source address of the second unicast join message is the address of the apparatus, and a destination address of the second unicast join message is the multicast source address or the RP address.

Optionally, the apparatus supports the Protocol Independent Multicast-Sparse Mode PIM-SM protocol, and the processing unit 920 is further configured to: before the second unicast join message is sent, look up a table based on the multicast source address or the RP address, to obtain an address of an upstream neighbor of the apparatus; and determine, based on the address of the upstream neighbor, whether the upstream neighbor supports the PIM-SM protocol; and the sending unit is specifically configured to: if the upstream neighbor does not support the PIM-SM protocol, send the second unicast join message.

Optionally, the receiving unit 910 is further configured to receive a first unicast prune message sent by a third network device, where the first unicast prune message is used to request to leave the multicast group, a source address of the first unicast prune message is an address of the third network device, and a destination address of the first unicast prune message is the multicast source address or the RP address; and the processing unit 920 is further configured to: determine, based on the first unicast prune message, whether there is a first multicast forwarding entry corresponding to information carried in the first unicast prune message; if there is no first multicast forwarding entry, determine whether the address of the apparatus is the same as the destination address of the first unicast prune message; and if the address of the apparatus is the same as the destination address of the first unicast prune message, ignore the first unicast prune message; or if the address of the apparatus is different from the destination address of the first unicast prune message, continue to forward the first unicast prune message based on the destination address of the first unicast prune message.

Optionally, the processing unit 920 is further configured to: if there is the first multicast forwarding entry, determine whether there is a tunnel from the apparatus to the third network device; and if there is no tunnel from the apparatus to the third network device, delete, from an outbound interface list of the first multicast forwarding entry, a physical interface used for receiving the first unicast prune message; or if there is the tunnel from the apparatus to the third network device, tear down the tunnel from the apparatus to the third network device, and delete the tunnel from the apparatus to the third network device from an outbound interface list of the first multicast forwarding entry.

Optionally, the processing unit 920 is further configured to: determine whether the outbound interface list of the first multicast forwarding entry is empty; and if the outbound interface list of the first multicast forwarding entry is empty, delete the first multicast forwarding entry.

Optionally, the apparatus is a multicast source or a rendezvous point RP, and the sending unit is further configured to send a second unicast prune message, where the second unicast prune message is used to request to leave the multicast group, a source address of the second unicast prune message is the address of the apparatus, and a destination address of the second unicast prune message is the multicast source address or the RP address.

Optionally, the processing unit 920 is further configured to: when a multicast packet is received, determine whether there is a second multicast forwarding entry corresponding to a destination address of the multicast packet; and if there is no second multicast forwarding entry, determine whether the multicast packet has been encapsulated by using a tunnel; and the sending unit is further configured to: if the multicast packet has not been encapsulated by using the tunnel, send a third unicast prune message, where the third unicast prune message is used to request to leave the multicast group, a source address of the third unicast prune message is the address of the apparatus, and a destination address of the third unicast prune message is the multicast source address or the RP address; or if the multicast packet has been encapsulated by using the tunnel, send a fourth unicast prune message, where the fourth unicast prune message is used to request to leave the multicast group, a source address of the fourth unicast prune message is the address of the apparatus, and a destination address of the fourth unicast prune message is a tunnel source address of the tunnel used for encapsulating the multicast packet.

Optionally, the first unicast join message is a periodically sent message, a sending cycle of the first unicast join message is a first time period, and the processing unit 920 is further configured to: if the first unicast join message sent again by the second network device is not received within the first time period, tear down the tunnel from the apparatus to the second network device.

It should be understood that the apparatus 900 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs, and a memory, a merged logic circuit, and/or another appropriate component that supports the described functions. In an optional example, a person skilled in the art may understand that the apparatus 900 may be specifically the first network device in the foregoing embodiments, and the apparatus 900 may be configured to perform procedures and/or steps that are corresponding to the first network device in the foregoing method embodiments. To avoid repetition, details are not described herein again.

Figure 10:
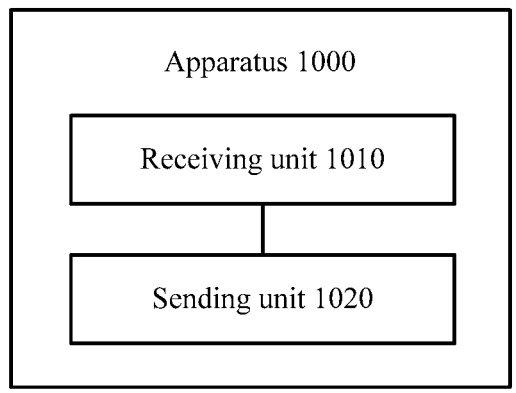
FIG. 10 is a schematic block diagram of another multicast service implementation apparatus according to an embodiment of this application.

FIG. 10 shows a multicast service implementation apparatus 1000 according to an embodiment of this application. The apparatus 1000 includes:

a receiving unit 1010, configured to receive a join request message, where the join request message is used to request to join a multicast group, and the join request message carries a multicast group address; and a sending unit 1020, configured to send a first unicast join message based on the join request message, where the first unicast join message is used to request to join the multicast group, a source address of the first unicast join message is an address of the apparatus, and a destination address of the first unicast join message is a multicast source address or a rendezvous point RP address.

According to the multicast service implementation apparatus in this embodiment of this application, the unicast join message is introduced, and a remote multicast router that intercepts the unicast join message can automatically establish a tunnel to connect to a local router, to automatically traverse a unicast network. In this way, a multicast router whose next-hop router does not support a multicast routing protocol can join the multicast group, thereby helping improve availability of a multicast service.

Optionally, the apparatus supports the Protocol Independent Multicast-Sparse Mode PIM-SM protocol, and the apparatus further includes a first processing unit, configured to: before the first unicast join message is sent based on the join request message, look up a table based on the multicast source address or the RP address, to obtain an address of an upstream neighbor of the apparatus; and determine, based on the address of the upstream neighbor, whether the upstream neighbor supports the PIM-SM protocol; and the sending unit 1020 is specifically configured to: if the upstream neighbor does not support the PIM-SM protocol, send the first unicast join message.

Optionally, the receiving unit 1010 is further configured to receive a leave request message, where the leave request message is used to request to leave the multicast group, and the leave request message carries the multicast group address; and the apparatus further includes: a second processing unit, configured to: delete, based on the leave request message and from an outbound interface list of a multicast forwarding entry corresponding to the multicast group address, a physical interface used for receiving the leave request message, and determine whether the outbound interface list is empty; and the sending unit 1020 is further configured to: if the outbound interface list is empty, send a first unicast prune message, where the first unicast prune message is used to request to leave the multicast group, a source address of the first unicast prune message is the address of the apparatus, and a destination address of the first unicast prune message is the multicast source address or the RP address.

Optionally, the second processing unit is further configured to: before the first unicast prune message is sent, look up a table based on the multicast source address or the RP address, to obtain the address of the upstream neighbor of the apparatus; and determine, based on the address of the upstream neighbor, whether the upstream neighbor supports the PIM-SM protocol; and the sending unit 1020 is specifically configured to: if the upstream neighbor does not support the PIM-SM protocol, send the first unicast prune message.

It should be understood that the apparatus 1000 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs, and a memory, a merged logic circuit, and/or another appropriate component that supports the described functions. In an optional example, a person skilled in the art may understand that the apparatus 1000 may be specifically the second network device in the foregoing embodiments, and the apparatus 1000 may be configured to perform procedures and/or steps that are corresponding to the second network device in the foregoing method embodiments. To avoid repetition, details are not described herein again.

Figure 11:
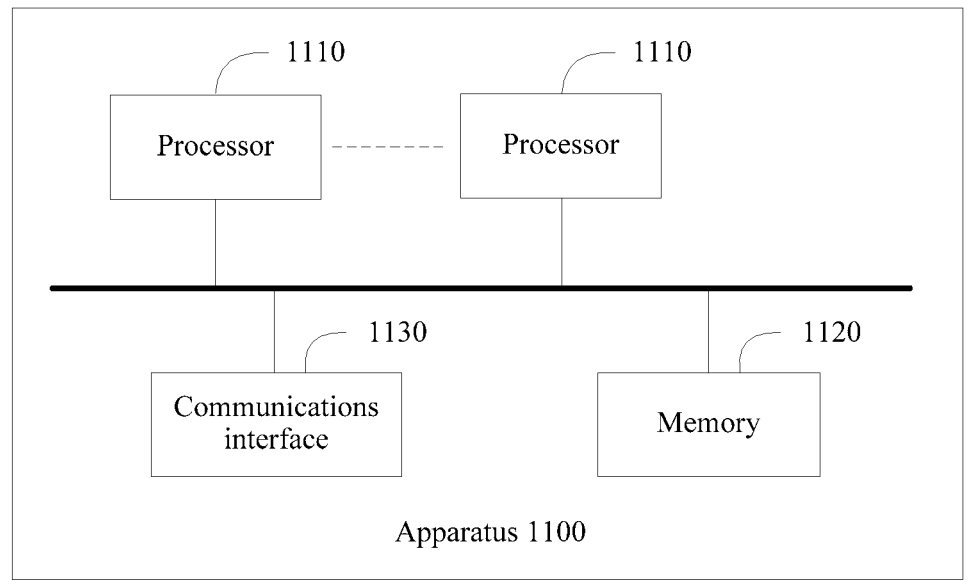
FIG. 11 is a schematic block diagram of another multicast service implementation apparatus according to an embodiment of this application.

FIG. 11 shows another multicast service implementation apparatus 1100 according to an embodiment of this application. The apparatus 1100 includes at least one processor 1110, a memory 1120, and a communications interface 1130. The at least one processor 1110, the memory 1120, and the communications interface 1130 are all connected by using an internal path.

The memory 1120 is configured to store a computer executable instruction.

The at least one processor 1110 is configured to execute the computer executable instruction stored in the memory 1120, so that the apparatus 1100 can exchange data with another apparatus by using the communications interface 1130, to perform the information processing method provided in the foregoing method embodiments.

The at least one processor 1110 is configured to perform the following operations:

receiving, by using the communications interface 1130, a first unicast join message sent by a second network device, where the first unicast join message is used to request to join a multicast group, a source address of the first unicast join message is an address of the second network device, and a destination address of the first unicast join message is a multicast source address or a rendezvous point RP address; and establishing a tunnel from the apparatus to the second network device based on the first unicast join message.

It should be understood that the apparatus 1100 may be specifically the first network device in the foregoing embodiments, and may be configured to perform the steps and/or procedures corresponding to the first network device in the foregoing method embodiments.

Figure 12:
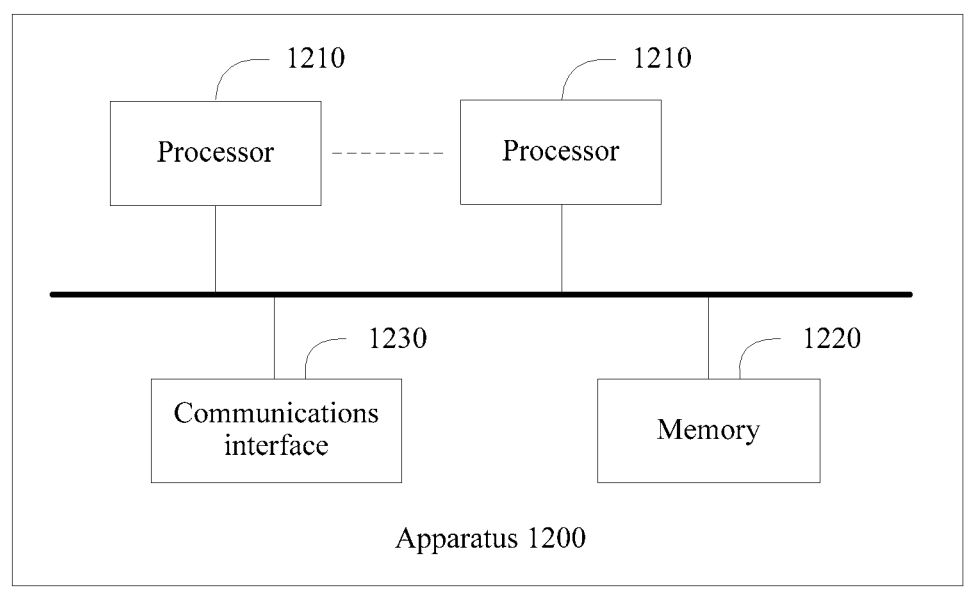
FIG. 12 is a schematic block diagram of another multicast service implementation apparatus according to an embodiment of this application.

FIG. 12 shows another multicast service implementation apparatus 1200 according to an embodiment of this application. The apparatus 1200 includes at least one processor 1210, a memory 1220, and a communications interface 1230. The at least one processor 1210, the memory 1220, and the communications interface 1230 are all connected by using an internal path.

The memory 1220 is configured to store a computer executable instruction.

The at least one processor 1210 is configured to execute the computer executable instruction stored in the memory 1220, so that the apparatus 1200 can exchange data with another apparatus by using the communications interface 1230, to perform the information processing method provided in the foregoing method embodiments.

The at least one processor 1210 is configured to perform the following operations:

receiving, by using the communications interface 1230, a join request message, where the join request message is used to request to join a multicast group, and the join request message carries a multicast group address; and sending a first unicast join message based on the join request message by using the communications interface 1230, where the first unicast join message is used to request to join the multicast group, a source address of the first unicast join message is an address of the apparatus, and a destination address of the first unicast join message is a multicast source address or a rendezvous point RP address.

It should be understood that the apparatus 1200 may be specifically the second network device in the foregoing embodiments, and may be configured to perform the steps and/or procedures corresponding to the second network device in the foregoing method embodiments.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory may be any one or any combination of the following storage media: a random access memory (RAM), a read-only memory (ROM), a nonvolatile memory (NVM), a solid state drive (SSD), a mechanical hard disk, a magnetic disk, and a disk array, and the like.

The communications interface is configured to exchange data between the apparatus and another device. The communications interface may be any one or any combination of the following components with a network access function: a network interface (for example, an Ethernet interface), a wireless network interface card, and the like.

Optionally, the at least one processor, the memory, and the communications interface may be connected by using a bus, and the bus may include an address bus, a data bus, a control bus, and the like. The bus may be any one or any combination of the following components used for wired data transmission: an Industry Standard Architecture (ISA) bus, a Peripheral Component Interconnect (PCI) bus, an Extended Industry Standard Architecture (EISA) bus, and the like.

In an implementation process, steps in the foregoing methods may be implemented by using a hardware integrated logic circuit in the processor, or by using an instruction in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and a processor executes an instruction in the memory and completes the steps in the foregoing methods in combination with hardware of the processor. To avoid repetition, details are not described herein again.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

A person of ordinary skill in the art may be aware that method steps and units in the examples described with reference to the embodiments disclosed in this specification may be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be indirect couplings or communication connections implemented through some interfaces, apparatuses, or units, or may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A multicast service implementation method comprising:
   receiving, by a first network device, a first unicast join message sent by a second network device,
      wherein the first unicast join message is used to request to join a multicast group,
      wherein a source address of the first unicast join message is an address of the second network device, and
      wherein a destination address of the first unicast join message is a multicast source address or a rendezvous point (RP) address;
   determining, by the first network device based on a first field carried in the first unicast join message, whether the second network device is a neighboring node of the first network device,
      wherein each time the first unicast join message is forwarded by one network device, a value of the first field is subtracted by 1; and
   upon the second network device not being the neighboring node of the first network device, establishing, by the first network device, a tunnel from the first network device to the second network device based on the first unicast join message.

2. The method according to claim 1 further comprising:
   receiving, by the first network device, a first unicast prune message sent by a third network device,
      wherein the first unicast prune message is used to request to leave the multicast group,
      wherein a source address of the first unicast prune message is an address of the third network device, and
      wherein a destination address of the first unicast prune message is the multicast source address or the RP address;
   determining, by the first network device based on the first unicast prune message, whether there is a first multicast forwarding entry corresponding to information carried in the first unicast prune message;
   in response to there being no first multicast forwarding entry, determining, by the first network device, whether the address of the first network device is the same as the destination address of the first unicast prune message; and
   in response to the address of the first network device being the same as the destination address of the first unicast prune message, ignoring, by the first network device, the first unicast prune message; or in response to the address of the first network device being different from the destination address of the first unicast prune message, continuing, by the first network device, to forward the first unicast prune message based on the destination address of the first unicast prune message.

3. The method according to claim 2 further comprising:
   in response to there being the first multicast forwarding entry, determining, by the first network device, whether there is a tunnel from the first network device to the third network device; and
   in response to there being no tunnel from the first network device to the third network device, deleting, by the first network device from an outbound interface list of the first multicast forwarding entry, a physical interface used for receiving the first unicast prune message; or in response to there being the tunnel from the first network device to the third network device, tearing down, by the first network device, the tunnel from the first network device to the third network device, and deleting, from the outbound interface list of the first multicast forwarding entry, the tunnel from the first network device to the third network device.

4. The method according to claim 3 further comprising:
   determining, by the first network device, whether the outbound interface list of the first multicast forwarding entry is empty; and
   deleting, by the first network device, the first multicast forwarding entry in response to the outbound interface list of the first multicast forwarding entry being empty.

5. The method according to claim 4, wherein the first network device is not a multicast source or an RP, and the method further comprises:
   sending, by the first network device, a second unicast prune message,
      wherein the second unicast prune message is used to request to leave the multicast group,
      wherein a source address of the second unicast prune message is the address of the first network device, and
      wherein a destination address of the second unicast prune message is the multicast source address or the RP address.

6. The method according to claim 1 further comprising:
   in response to that the first network device receiving a multicast packet, determining, by the first network device, whether there is a second multicast forwarding entry corresponding to a destination address of the multicast packet;
   in response to there being no second multicast forwarding entry, determining, by the first network device, whether the multicast packet has been encapsulated by using a tunnel; and
   sending, by the first network device, a third unicast prune message in response to the multicast packet not being encapsulated by using the tunnel,
      wherein the third unicast prune message is used to request to leave the multicast group,
      wherein a source address of the third unicast prune message is the address of the first network device, and
      wherein a destination address of the third unicast prune message is the multicast source address or the RP address; or
   sending, by the first network device, a fourth unicast prune message in response to the multicast packet being encapsulated by using the tunnel,
      wherein the fourth unicast prune message is used to request to leave the multicast group,
      wherein a source address of the fourth unicast prune message is the address of the first network device, and
      wherein a destination address of the fourth unicast prune message is a tunnel source address of the tunnel used for encapsulating the multicast packet.

7. A multicast service implementation method comprising:
   receiving, by a second network device, a join request message sent by a first network device,
      wherein the join request message is a request by the first network device to join a multicast group, and the join request message carries a multicast group address; and
   sending, by the second network device, a first unicast join message to the first network device based on the join request message,
      wherein the first unicast join message is used to request the first network device join the multicast group,
      wherein a source address of the first unicast join message is an address of the second network device,
      wherein a first field of the first unicast join message includes information for determining whether the second network device is a neighboring node of the first network device,
      wherein each time the first unicast join message is forwarded by one network device, a value of the first field is subtracted by 1; and
      wherein a destination address of the first unicast join message is a multicast source address or a rendezvous point (RP) address; and
   upon the second network device not being the neighboring node of the first network device, cooperating by the second network device with the first network device to establish a tunnel from the first network device to the second network device based on the first unicast join message.

8. The method according to claim 7, wherein the second network device supports a protocol independent multicast-sparse mode (PIM-SM) protocol, and before sending, by the second network device, the first unicast join message based on the join request message, the method further comprises:
   looking up, by the second network device, a table based on the multicast source address or the RP address, to obtain an address of an upstream neighbor of the second network device; and
   determining, by the second network device based on the address of the upstream neighbor, whether the upstream neighbor supports the PIM-SM protocol; and
   wherein sending, by the second network device, the first unicast join message based on the join request message comprises:
   sending, by the second network device, the first unicast join message in response to the upstream neighbor not supporting the PIM-SM protocol.

9. The method according to claim 7 further comprising:
   receiving, by the second network device, a leave request message used to request to leave the multicast group,
      wherein the leave request message carries the multicast group address;
   deleting, by the second network device and based on the leave request message, from an outbound interface list of a multicast forwarding entry associated with the multicast group address, a physical interface used for receiving the leave request message, and determining whether the outbound interface list is empty; and
   sending, by the second network device, a first unicast prune message in response to the outbound interface list being empty,
      wherein the first unicast prune message is used to request to leave the multicast group,
      wherein a source address of the first unicast prune message is the address of the second network device, and
      wherein a destination address of the first unicast prune message is the multicast source address or the RP address.

10. The method according to claim 9, wherein before the sending, by the second network device, the first unicast prune message, the method further comprises:
   looking up, by the second network device, a table based on the multicast source address or the RP address, to obtain an address of an upstream neighbor of the second network device; and
   determining, by the second network device based on the address of the upstream neighbor, whether the upstream neighbor supports a protocol independent multi-cast-sparse mode (PIM-SM) protocol; and wherein sending, by the second network device, the first unicast prune message comprises sending the first unicast prune message in response to the upstream neighbor not supporting the PIM-SM protocol.

11. A multicast service implementation apparatus comprising a processor and a receiver that cooperate to provide at least the following operations:
 receive a first unicast join message sent by a second network device,
  wherein the first unicast join message is used to request to join a multicast group,
  wherein a source address of the first unicast join message is an address of the second network device, and
  wherein a destination address of the first unicast join message is a multicast source address or a rendezvous point (RP) address; and
 determine, based on a first field carried in the first unicast join message, whether the second network device is a neighboring node of the first network device,
  wherein each time the first unicast join message is forwarded by one network device, a value of the first field is subtracted by 1; and
 establish a tunnel from the apparatus to the second network device based on the first unicast join message.

12. The apparatus according to claim 11, wherein the receiver and processor are further configured to cooperate and provide the following operations:
 receive a first unicast prune message sent by a third network device,
  wherein the first unicast prune message is used to request to leave the multicast group,
  wherein a source address of the first unicast prune message is an address of the third network device, and
  wherein a destination address of the first unicast prune message is the multicast source address or the RP address;
 determine, based on the first unicast prune message, whether there is a first multicast forwarding entry corresponding to information carried in the first unicast prune message;
 in response to there being no first multicast forwarding entry, determine whether the address of the apparatus is the same as the destination address of the first unicast prune message; and
 in response to the address of the apparatus being the same as the destination address of the first unicast prune message, ignore the first unicast prune message; or in response to the address of the apparatus being different from the destination address of the first unicast prune message, continue to forward the first unicast prune message based on the destination address of the first unicast prune message.

13. The apparatus according to claim 12, wherein the processor and the receiver are further configured to cooperate and provide the following operations:
 in response to there being the first multicast forwarding entry, determine whether there is a tunnel from the apparatus to the third network device; and
 in response to there being no tunnel from the apparatus to the third network device, delete, from an outbound interface list of the first multicast forwarding entry, a physical interface used for receiving the first unicast prune message; or in response to there being the tunnel from the third network device, tear down the tunnel from the apparatus to the third network device, and delete, from the outbound interface list of the first multicast forwarding entry, the tunnel from the apparatus to the third network device.

14. The apparatus according to claim 13, wherein the processor and the receiver are further configured to cooperate and provide the following operations:
 determine whether the outbound interface list of the first multicast forwarding entry is empty; and
 in response to the outbound interface list of the first multicast forwarding entry being empty, delete the first multicast forwarding entry.

15. The apparatus according to claim 14, wherein the apparatus is a multicast source or a rendezvous point (RP), and further comprises a sender which is configured to cooperate with the processor to:
 send a second unicast prune message,
  wherein the second unicast prune message is used to request to leave the multicast group,
  wherein a source address of the second unicast prune message is the address of the apparatus, and
  wherein a destination address of the second unicast prune message is the multicast source address or the RP address.

16. The apparatus according to claim 11, wherein the processor and the receiver are further configured to cooperate and provide the following operations:
 in response to a multicast packet being received, determine whether there is a second multicast forwarding entry corresponding to a destination address of the multicast packet; and
 in response to there being no second multicast forwarding entry, determine whether the multicast packet has been encapsulated by using a tunnel; and
 wherein the apparatus further comprises a sender which is configured to cooperate with the processor and provide the following operations:
 in response to the multicast packet not being encapsulated by using the tunnel, send a third unicast prune message,
  wherein the third unicast prune message is used to request to leave the multicast group,
  wherein a source address of the third unicast prune message is the address of the apparatus, and
  wherein a destination address of the third unicast prune message is the multicast source address or the RP address; or
 in response to the multicast packet being encapsulated by using the tunnel, send a fourth unicast prune message,
  wherein the fourth unicast prune message is used to request to leave the multicast group,
  wherein a source address of the fourth unicast prune message is the address of the apparatus, and
  wherein a destination address of the fourth unicast prune message is a tunnel source address of the tunnel used for encapsulating the multicast packet.

17. A multicast service implementation apparatus comprising one or more processors, a receiver and a transmitter that cooperate to provide at least the following operations:
 receive a join request message sent by a first network device,
  wherein the join request message a request by the first network device to join a multicast group, and the join request message carries a multicast group address; and
 send a first unicast join message to the first network device based on the join request message,
  wherein the first unicast join message is used to request the first network device join the multicast group, wherein a source address of the first unicast join message is an address of the apparatus, wherein a first field of the first unicast join message includes information for determining whether the second network device is a neighboring node of the first network device, wherein each time the first unicast join message is forwarded by one network device, a value of the first field is subtracted by 1; and wherein a destination address of the first unicast join message is a multicast source address or a rendezvous point (RP) address; and upon the second network device not being the neighboring node of the first network device, cooperating by the second network device with the first network device to establish a tunnel from the first network device to the second network device based on the first unicast join message.

18. The apparatus according to claim 17, wherein the apparatus supports a protocol independent multicast-sparse mode (PIM-SM) protocol, and wherein the one or more processors, the receiver and the transmitter cooperate to further provide at least the following operations:

before the first unicast join message is sent, look up a table, based on the multicast source address, to obtain an address of an upstream neighbor of the apparatus; and determine, based on the address of the upstream neighbor, whether the upstream neighbor supports the PIM-SM protocol; and the transmitter is further configured to cooperate with the one or more processors to send the first unicast join message in response to the upstream neighbor not supporting the PIM-SM protocol.

19. The apparatus according to claim 17, wherein the receiver is further configured to receive a leave request message from the first network device, wherein the leave request message is a request from a sender to leave the multicast group, wherein the leave request message carries the multicast group address, and wherein the one or more processors, the receiver and the transmitter cooperate to further provide at least the following operations:

delete, based on the leave request message and from an outbound interface list of a multicast forwarding entry corresponding to the multicast group address, a physical interface used for receiving the leave request message, and determine whether the outbound interface list is empty; and wherein the transmitter is further configured to cooperate with the one or more processors to:

send a first unicast prune message in response to that the outbound interface list is empty, wherein the first unicast prune message is used to request to leave the multicast group, wherein a source address of the first unicast prune message is the address of the apparatus, and wherein a destination address of the first unicast prune message is the multicast source address or the RP address.

20. The apparatus according to claim 19, wherein the one or more processors, the receiver and the transmitter cooperate to further provide at least the following operations:

before the first unicast prune message is sent, look up a table based on the multicast source address to obtain the address of the upstream neighbor of the apparatus; and determine, based on the address of the upstream neighbor, whether the upstream neighbor supports a protocol independent multicast-sparse mode (PIM-SM) protocol; and send the first unicast prune message in response to the upstream neighbor not supporting the PIM-SM protocol.

* * * * *

UNITED STATES PATENT AND TRADEMARK OFFICE
CERTIFICATE OF CORRECTION

PATENT NO. : 11,374,778 B2
APPLICATION NO. : 16/862055
DATED : June 28, 2022
INVENTOR(S) : Meng et al.

It is certified that error appears in the above-identified patent and that said Letters Patent is hereby corrected as shown below:

In the Claims

Claim 6: Column 39, Line 22: "in response to that the first network device receiving a" should read -- in response to the first network device receiving a --.

Claim 10: Column 40, Line 66: "neighbor supports a protocol independent multi-cast-" should read -- neighbor supports a protocol independent multicast- --.

Signed and Sealed this
First Day of November, 2022

Katherine Kelly Vidal
*Director of the United States Patent and Trademark Office*